US012459907B2

(12) United States Patent
Porcs-Makkay et al.

(10) Patent No.: US 12,459,907 B2
(45) Date of Patent: Nov. 4, 2025

(54) PROCESS FOR THE PRODUCTION OF OZANIMOD

(71) Applicant: EGIS GYOGYSZERGYAR ZRT., Budapest (HU)

(72) Inventors: Marta Porcs-Makkay, Budapest (HU); Gyula Simig, Budapest (HU); Eniko Molnar, Erd (HU); Janos Petho, Budapest (HU); Balazs Volk, Budapest (HU); Laszlo Szlavik, Budapest (HU); Eva Szabo, Budapest (HU); Judit Halasz, Budapest (HU)

(73) Assignee: EGIS GYOGYSZERGYAR ZRT., Budapest (HU)

( * ) Notice: Subject to any disclaimer, the term of this patent is extended or adjusted under 35 U.S.C. 154(b) by 0 days.

(21) Appl. No.: 16/615,468

(22) PCT Filed: May 18, 2018

(86) PCT No.: PCT/HU2018/050019
§ 371 (c)(1),
(2) Date: Nov. 21, 2019

(87) PCT Pub. No.: WO2018/215807
PCT Pub. Date: Nov. 29, 2018

(65) Prior Publication Data
US 2020/0087269 A1    Mar. 19, 2020

(30) Foreign Application Priority Data
May 22, 2017   (HU) .................... P1700216

(51) Int. Cl.
*C07D 271/06*   (2006.01)
(52) U.S. Cl.
CPC ........ *C07D 271/06* (2013.01); *C07B 2200/13* (2013.01)
(58) Field of Classification Search
None
See application file for complete search history.

(56) References Cited

U.S. PATENT DOCUMENTS

| 8,362,048 | B2 | 1/2013 | Martinborough et al. |
| 9,388,147 | B2 | 7/2016 | Martinborough et al. |
| 9,469,627 | B2 | 10/2016 | Vandeusen et al. |
| 9,937,175 | B2 | 4/2018 | Vandeusen et al. |
| 10,239,846 | B2 | 3/2019 | Martinborough et al. |
| 2011/0172202 | A1 | 7/2011 | Martinborough et al. |
| 2012/0190695 | A1 | 7/2012 | Vandeusen et al. |
| 2013/0231326 | A1 | 9/2013 | Martinborough et al. |
| 2015/0299149 | A1 | 10/2015 | Martinborough et al. |
| 2017/0165236 | A1* | 6/2017 | Martinborough .... A61K 31/137 |
| 2017/0231990 | A1 | 8/2017 | Vandeusen et al. |
| 2017/0320839 | A1 | 11/2017 | Martinborough et al. |
| 2019/0000845 | A1 | 1/2019 | Vandeusen et al. |
| 2019/0241530 | A1 | 8/2019 | Sheng et al. |
| 2019/0337908 | A1 | 11/2019 | Chen et al. |

FOREIGN PATENT DOCUMENTS

| WO | 2011/044307 A1 | 4/2011 |
| WO | 2011/060392 A1 | 5/2011 |
| WO | 2017/215617 A1 | 12/2017 |
| WO | 2018/033149 A1 | 2/2018 |
| WO | 2018049632 A1 | 3/2018 |

OTHER PUBLICATIONS

Chemical Abstract Registry No. 1306760-87-1, indexed in the Registry File on STN CAS Online Jun. 7, 2011.*
Myer, Andrew. "Protective Groups—Silicon-Based Protection of the Hydroxyl Group." Chem 115, 2023, Harvard University, https://myers.faculty.chemistry.harvard.edu/pages/chem-115-handouts. Class Handout.*
International Search Report dated Sep. 12, 2018 issued in corresponding PCT/HU2018/050019 application (5 pages).

* cited by examiner

*Primary Examiner* — Po-Chih Chen
(74) *Attorney, Agent, or Firm* — Csaba Henter; MILLEN, WHITE, ZELANO & BRANIGAN

(57) ABSTRACT

The present invention relates a new process for the preparation of ozanimod of the formula and acid addition salts, via new intermediates and a new polimop form of ozanimod base.

25 Claims, 5 Drawing Sheets

PROCESS FOR THE PRODUCTION OF OZANIMOD

Our invention relates to a process for the production of (I)

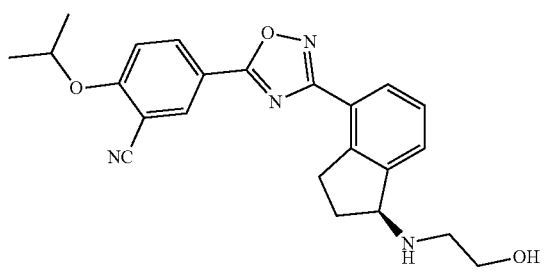

formula (I) ozanimod and its salts and to the novel pharmaceutical industry intermediate products used during the process.

Ozanimod is a second-generation sphingosine-1-phosphate (S1P) receptor modulator, which is being developed for the treatment of multiple sclerosis, ulcerative colitis and Crohn's disease. Ozanimod is an optically active substance, the absolute configuration of its asymmetric carbon atom is S.

THE STATE OF THE ART

Figure 1:
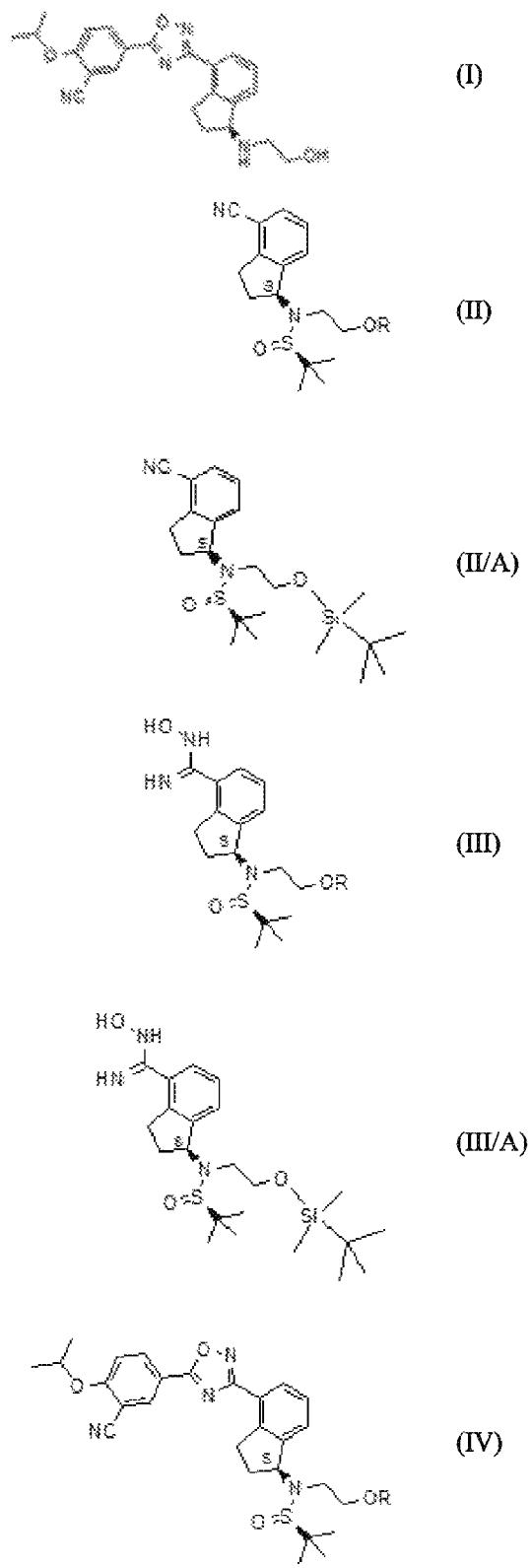

International patent application number WO 2009151529 discloses the production of a racemic compound that corresponds to ozanimod (FIG. 1). As the ozanimod active substance is an optically active compound, the racemic mixture should be resolved for its production. Patent application number WO 2009151529 does not provide a solution for this.

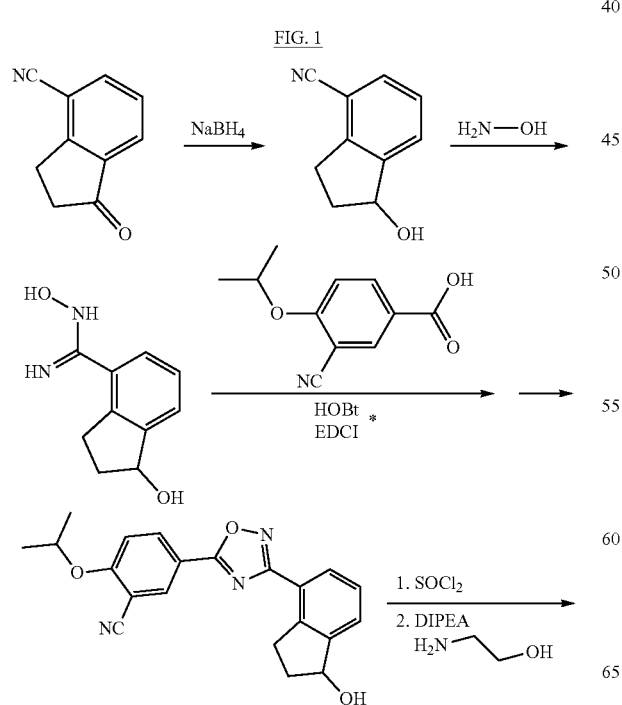

FIG. 1

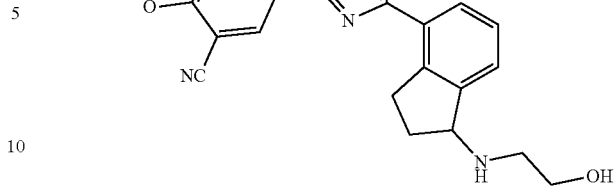

*the example is given for a different benzoic acid

International patent application number WO 2011060392 discloses the production of ozanimod by chiral synthesis (FIG. 2):

FIG. 2

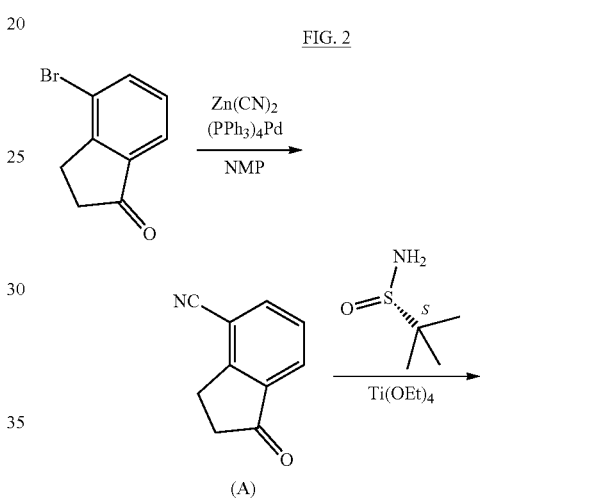

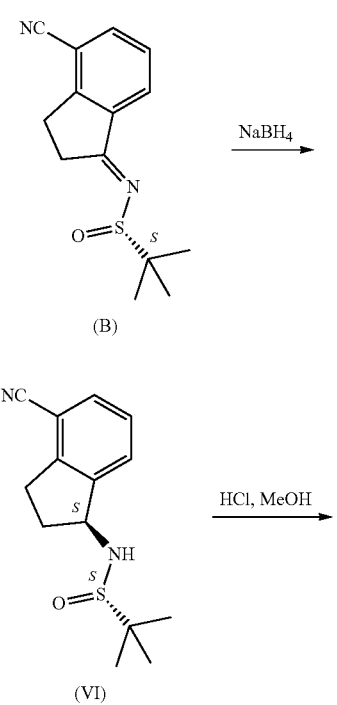

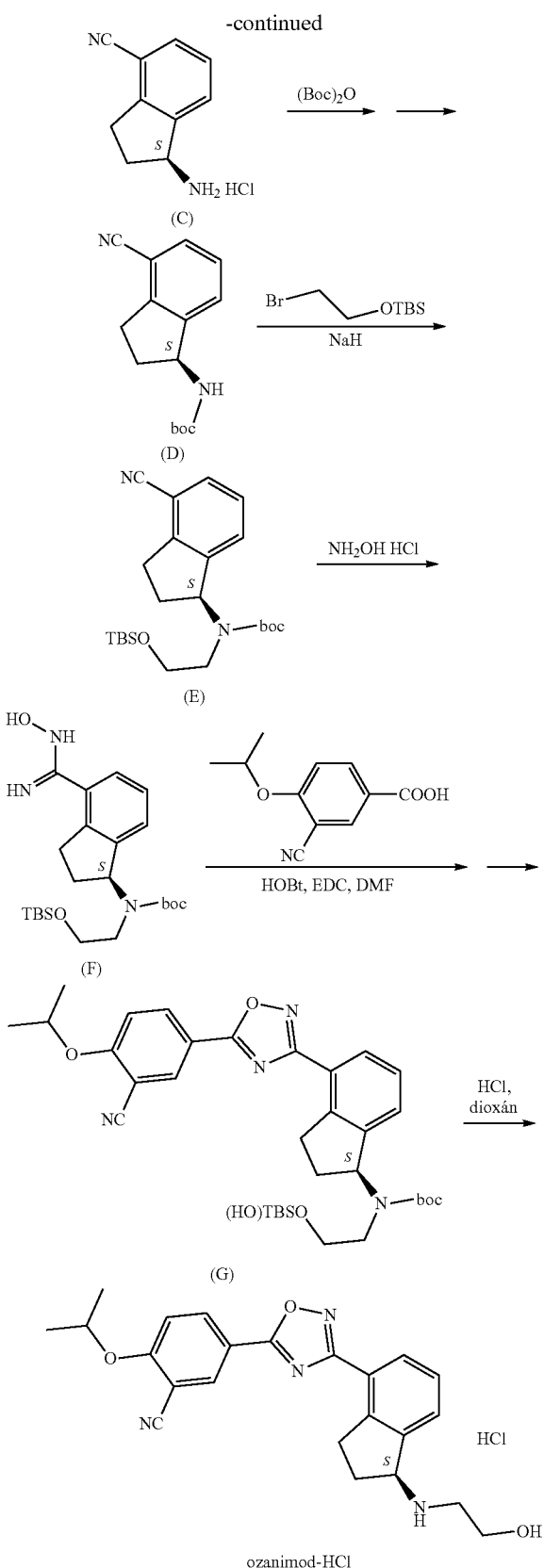

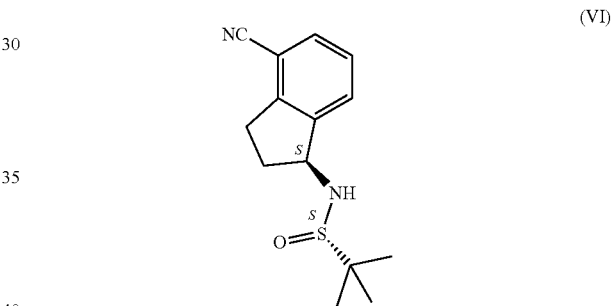

Schiff base (B) formed is reduced with sodium borohydride in this way obtaining the formula (VI) key intermediate. The novel asymmetric carbon atom formed during the reaction, as a consequence of the asymmetric induction created by the previously introduced chiral group, mainly has an S absolute configuration. Following this the (S)-2-methylpropane-2-sulfinyl group is removed and the protecting group t-butoxycarbonyl (Boc) is introduced to the primary amine obtained. The (D) amide produced in this way is alkylated with (2-bromoethoxy)-t-butyldimethylsilane. Following hydroxylamine is added to the nitrile group, then the 1,2,4-oxadiazole ring is formed using the appropriate benzoic acid derivative. During this operation the t-butyldimethylsilyl group partially cleaves. Then ozanimod is obtained by removing the still remaining t-butyldimethylsilyl group and the Boc protective group from the mixture obtained in this way.

A similar procedure is described in the specification with publication number WO 2016164180, which discloses the production of deuterated derivatives.

In other words during the process described in patent applications numbers WO 2011060392 and WO 2016164180 the chiral centre is established in the initial phase of the synthesis. Asymmetrical induction occurs during the sodium borohydride reduction, and so compound (VI) is created in the large majority.

On the other hand selectivity is not necessarily complete and the other diastereomer is expected to also appear as a contaminant. This was worded in paragraph 263 of patent application publication number WO 2011060392 as follows: the presented process results in a final product enriched with the desired enantiomer. Neither patent application publication number WO 2011060392, nor WO 2016164180 includes an example which gives the enantiomer purity of the intermediate (VI) or teaching on its purification. In the course of the embodiments, in both cases, the oily or solid product obtained following reduction is used in the following steps of the synthesis without purification. In the syntheses according to documents WO 2011060392 and WO 2016164180 the following step removes the sulfinyl group and the synthesis is continued using the obtained "enantiomer rich" but not pure formula (C) amine.

During the approval procedure of active substances in the pharmaceutical industry they have to comply with increasingly strict requirements in terms of all their physical and chemical characteristics. Therefore enantiomer purity is also of outstanding importance in the case of chiral active substances. It is obvious for a person skilled in the art that in the phase of the synthesis following this the enantiomer contaminants of the individual phase products can only be detected using chiral chromatography, and if the enantiomer purity of the individual intermediate products or of the During the synthesis 1-oxo-2,3-dihydro-1H-indene-4-carbonitrile (A) is reacted with the optically active (S)-2-methylpropane-2-sulfinamide, then the C=N bond of the ozanimod final product is insufficient, they can only be purified by interposing further purification steps, such as chiral chromatography or a process based on diastereomer salt formation. Chiral chromatography is only economical in the case of the purification of smaller amounts, and purification via diastereomer salts may demand the use of expensive resolving agents, and/or multiple recrystallization steps, which may increase the length of the outlined process with further operation steps.

The objective of the invention is to overcome the disadvantages of the known processes and to elaborate a process for the production of the ozanimod of formula (I) and its salts that can be implemented simply and economically at industrial scales, with fewer synthesis steps.

The objective was achieved by elaborating a synthesis pathway in which the tert-butylsulfinyl group is maintained on the amino group on the chiral carbon atom of the intermediates until the final step of the synthesis, in this way making the introduction and removal of the Boc protective group unnecessary and the side-products with unwanted stereochemistry created as a result of incomplete chiral induction of the tert-butylsulfinyl exhibited during the borohydride reduction appear in the following steps of the synthesis pathway not as enantiomer but as diastereomer contaminants, due to which they are easier to analyse and it is easier to remove them through purification operations.

THE ESSENCE OF THE INVENTION

The essence of the invention is a novel process for the production of

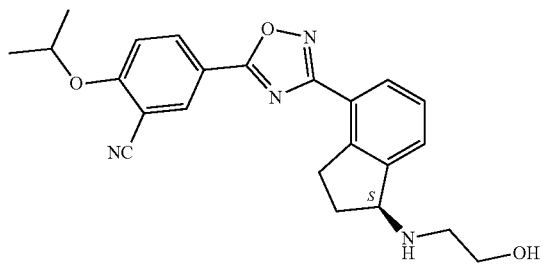

(I)

ozanimod of formula (I) and its acid addition salts in such a way that the protective group/protective groups that may be removed in an acidic medium are cleaved in an organic solvent a.)

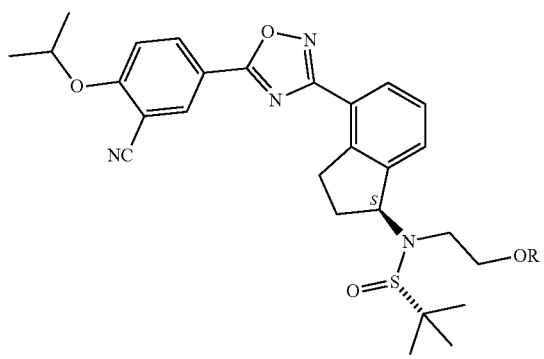

(IV)

from the compound or compounds of general formula (IV), in which compounds R represents a protective group that may be removed in an acidic medium serving for the temporary protection of the hydroxyl group, or b.)

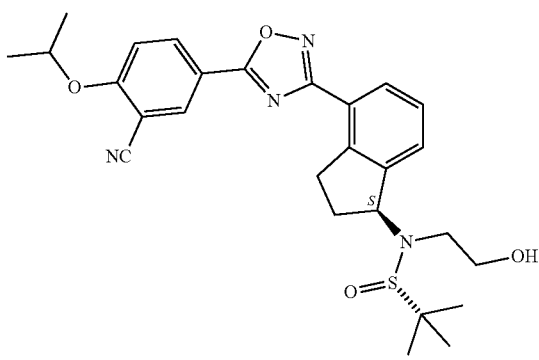

(V)

from the compound of formula (V), or c.)

from the compounds in a mixture of any ratio of the compounds of general formula (IV) and formula (V), and the formula (I) ozanimod obtained in this way is optionally transformed into an acid addition salt. Preferably the formula (I) ozanimod is transformed into a salt simultaneously with the removal of the protective groups. Most preferably the ozanimod is transformed into

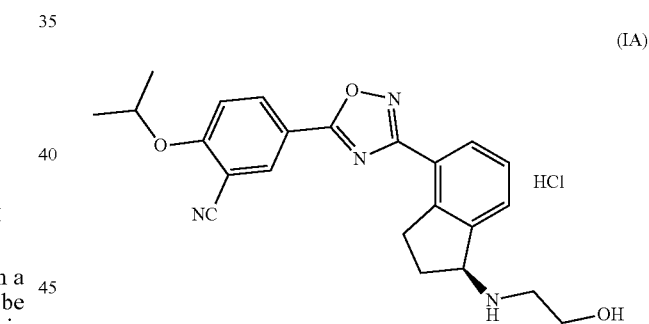

(IA)

the formula (I/A) hydrochloride salt.

According to one of the preferable embodiments of our invention substituted methyl ether type groups, preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, or 1-[2-(trimethylsilyl)ethoxy]ethyl group, a silyl ether type group, preferably a trimethylsilyl, triisopropylsilyl, t-butyldimethylsilyl or triphenylsilyl group is used as the protective group that may be removed in an acidic medium serving for the temporary protection of the hydroxyl group in the compound of general formula (IV).

According to another preferable embodiment of our invention a mixture of compound of general formula (IV) and formula (V) is used in the reaction.

An ether type solvent, such as dioxane, a 1 to 4 carbon atom alcohol, preferably 2-propanol, ethanol or methanol, most preferably 2-propanol, or an aromatic solvent, preferably toluene or xylene as the aromatic solvent, more preferably toluene is used as the organic solvent.

According to a preferable embodiment of our invention to cleave the protective group that may be removed in an acidic medium serving for the temporary protection of the hydroxyl group acid is used, preferably hydrochloric acid, hydrogen bromide, hydrogen iodide, hydrogen fluoride (HF), sulphuric acid, nitric acid, or their salts, tetrabutylammonium fluoride (TBAF), a mixture of TBAF and acetic acid, an aqueous mixture of HF and THF, or 1 M aqueous HIO$_4$ dissolved in THF.

It was surprising to find that if the (S)-2-methylpropane-2-sulfinyl group is not removed from the compound of formula (VI), it operates as a suitable protective group during the further reaction steps. Therefore, throughout the entire synthesis, in addition to the desired (S,S) diastereomer, the undesired (R) configuration 1H-indene derivative is present in the form of the (S,R) diastereomer. In general, the different physical characteristics of diastereomers make it possible to separate them via crystallization. As a consequence of the different physical properties (solubility, adsorption characteristics) they may be detected and separated from each other without chiral chromatography. Therefore, there is no need to remove the (S)-2-methylpropane-2-sulfinyl group and introduce a t-butoxycarbonyl (Boc) protective group in its place. Through this, the synthesis pathway leading to ozanimod is significantly shortened.

DETAILED DESCRIPTION OF THE INVENTION

Our invention then is a process for the production of ozanimod of formula (I) and its acid addition salts, characterised by that the protective group or protective groups that may be removed in an acidic medium are removed in an organic solvent

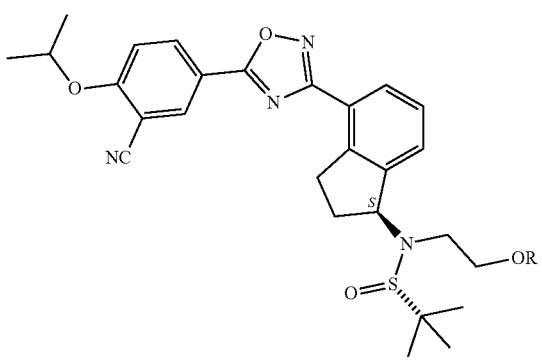

(IV)

from the compound of general formula (IV), in which R represents a hydrogen or a protective group that may be removed in an acidic medium serving for the temporary protection of the hydroxyl group, or

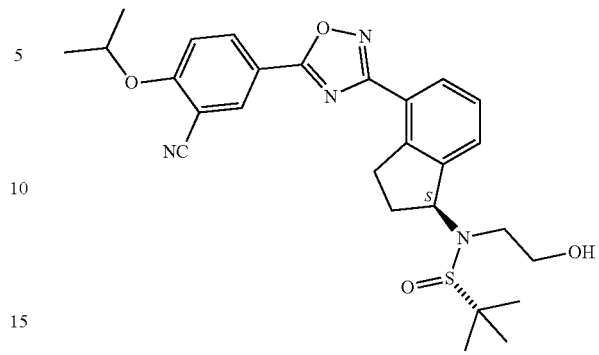

(V)

from the compound of formula (V), or from a mixture of any ratio of these, and the ozanimod of formula (I) obtained in this way is optionally transformed, if necessary, into an acid addition salt. Preferably simultaneously with the removal of the protective groups the ozanimod of formula (I) is transformed into a salt. Most preferably the ozanimod is transformed into

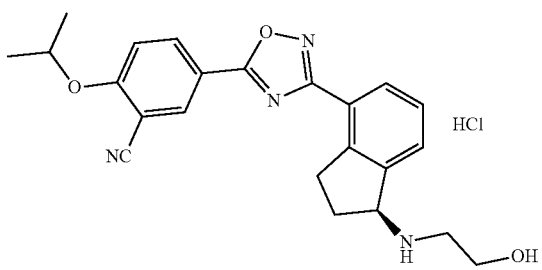

(IA)

its hydrochloride salt of formula (IA).

According to a preferable embodiment of our invention substituted methyl ether type compounds, preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, or 1-[2-(trimethylsilyl)ethoxy]ethyl group, a silyl ether type group, preferably a trimethylsilyl, triisopropylsilyl, t-butyldimethylsilyl or triphenylsilyl group is used as the protective group that may be removed in an acidic medium serving for the temporary protection of the hydroxyl group in the compound of general formula (IV). According to one of the preferable embodiments of our invention a mixture of compound of general formula (IV) and formula (V) is used in the process. An ether type solvent, preferably dioxane, a 1 to 4 carbon atom alcohol, preferably 2-propanol, ethanol or methanol, most preferably 2-propanol, or an aromatic solvent, preferably toluene or xylene, more preferably toluene is used as the organic solvent in the process. The acid used to implement the process is an inorganic acid such as hydrochloric acid, hydrogen bromide, hydrogen iodide, hydrogen fluoride (HF), or their salts: tetrabutylammonium fluoride (TBAF), a mixture of TBAF and acetic acid, aqueous HF and THF, 1 M aqueous HIO$_4$ in THF, etc. (see Peter G. M. Wuts; Theodora W. Greene, Greene's protective groups in Organic Synthesis, Fourth Edition, Wiley Interscience, 2007), preferably hydrochloric acid. According to a preferable embodiment of the invention, the acid is used in a concentrated aqueous solution, in a mixture of organic solvent and water or dissolved in an organic solvent, preferably using dioxane, 2-propanol, ethanol or methanol as the solvent.

It was surprising to find that if the (S)-2-methylpropane-2-sulfinyl group is not removed from the compound of formula (VI), it operates as a suitable protective group during the further reaction steps. Therefore, there is no need to remove the (S)-2-methylpropane-2-sulfinyl group and introduce Boc protective group in its place. Through this the synthesis pathway leading to ozanimod is significantly shortened.

In the process according to the invention the production of the compound of general formula (IV), in which R represents a hydrogen or a protective group that may be removed in an acidic medium serving for the temporary protection of the hydroxyl group, and the compound of formula (V) or mixture thereof is prepared so that
a.) the formula

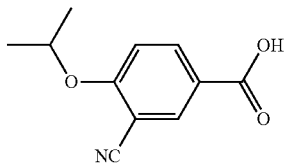

(VIII) 3-cyano-4-(i-propoxy)benzoic acid is activated in an organic solvent, then

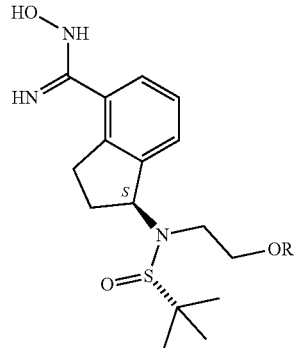

reacted with the compound of general formula (III), in which compound R represents a protective group that may be removed in an acidic medium serving for the temporary protection of the hydroxyl group, preferably a substituted methyl ether type group, more preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, or 1-[2-(trimethylsilyl)ethoxy]ethyl group, a silyl ether type group, preferably a trimethylsilyl, triisopropylsilyl, t-butyldimethylsilyl or triphenylsilyl group, most preferably a t-butyldimethylsilyl group, then optionally
b.) the obtained compound of general formula (IV) and the compound of formula (V) are isolated from each other.

The amounts and proportions of the compound of general formula (IV) and of the compound of formula (V) vary. These proportions depend on the temperature of the reaction and the reaction duration. However, as in the following step both compounds are transformed into the ozanimod of formula (I), there is no special significance to these proportions from the point of view of the invention. Both components of the mixture are transformed into ozanimod acid addition salt through the cleaving of the protective group/groups, depending on the acid used.

According to a preferable embodiment of the invention the 1,2,4-oxadiazole ring is closed by activating the formula (VIII) 3-cyano-4-(i-propoxy)benzoic acid in an organic solvent, then reacted with the compound of general formula (III). Preferably amide, aromatic, ether, ester, nitrile or sulfoxide type solvents are used as the organic solvent, most preferably dimethylformamide is used as the amide type solvent, preferably xylene or toluene is used as the aromatic solvent, most preferably toluene, most preferably tetrahydrofuran or dioxane is used as the ether type solvent, acetonitrile is used as the nitrile type solvent, dimethyl sulfoxide is used as the sulfoxide type solvent, and preferably toluene or ester type solvents are used, most preferably ethyl acetate is used. In the process according to the invention the benzoic acid of formula (VIII) is preferably activated in the presence of an organic base, more preferably in the presence of DIPEA (diisopropylethylamine), TEA (triethylamine) with disubstituted carbodiimide, preferably with dicyclohexylcarbodiimide, 1-ethyl-3-(3-dimethylaminopropyl)carbodiimide, or with carbonyl-diimidazole in the presence of hydroxybenzotriazole or with ethyl cyano glyoxylate-2-oxime, or with propanephosphonic acid anhydride (T3P). Most preferably it is activated with propanephosphonic acid anhydride (T3P).

Under the conditions used during the production of the 1,2,4-oxadiazole ring, the protective group R, depending on the protective group selected and the conditions used, may partially or completely cleave. Therefore, depending on the conditions, after ring closure, either a product is obtained in which the protective group R remains unchanged (compound of general formula IV), or the protective group is cleaved and the compound of formula (V) is formed. If the protective group is only partially cleaved, a mixture of the above is obtained. The protective groups still on them are cleaved from the product obtained in this way, or from the compounds forming the mixture, which mixture consists of the component of the compound of general formula (IV) and of the component of the compound of formula (V) and in this way the acid addition salt of ozanimod is obtained directly. So if the protective group R partially cleaves during ring closure it is possible to proceed by leaving this fact out of consideration and subject the mixture to acidic hydrolysis, but it is also possible to separate the compound of general formula (IV) from compound of formula (V), and cleave the protective groups separately after separation.

According to a very preferable embodiment of the invention there is no need to isolate the intermediates with formulas (IV) or (V) or a mixture of these. It is possible to proceed by reacting the compound of general formula (III) in a solvent not miscible with water with the compound of formula (VIII) in the presence of a base, then when ring closure is complete, and the reaction mixture contains the compound of formula (IV) or (V), or a mixture of these in any proportion and optionally ozanimod base, the reaction mixture is washed with an aqueous base, preferably with sodium or potassium hydrocarbonate solution and salt solution, then the toluene solution obtained is reacted with concentrated hydrochloric acid solution, as a result of which the protective groups are cleaved and the ozanimod hydrochloride precipitates in the form of crystals.

If necessary the ozanimod acid addition salt obtained in this way, e.g. ozanimod hydrochloride, is transformed into a base and recrystallized. The advantage of this is that the crystalline base obtained or the salt obtained from it by using hydrochloric acid has greater chemical purity than the raw ozanimod hydrochloride. In this case the process involves transforming the raw ozanimod hydrochloride into a base by adding preferably an inorganic base in an organic solvent, or in a mixture of an organic solvent and water, then by separating the ozanimod base from the organic phase. The base obtained in this way is dissolved in an organic solvent, and separated using hydrochloric acid, preferably 37% aqueous hydrochloric acid. A halogenated hydrocarbon, preferably dichloromethane, aromatic solvent, preferably toluene or a nitrile type solvent, preferably acetonitrile is used as the solvent. Alkaline metal hydroxides, carbonates or hydrocarbonates, preferably potassium or sodium hydroxides, carbonates or hydrogen carbonates may be used as the base.

The process is characterised by that to cleave the protective group that may be removed in an acidic medium serving for the temporary protection of the hydroxyl group acid is used, preferably aqueous hydrochloric acid, hydrochloric acid, hydrogen bromide, hydrogen iodide, hydrogen fluoride (HF), sulphuric acid, nitric acid, or their salts, tetrabutylammonium fluoride (TBAF), a mixture of TBAF and acetic acid, an aqueous mixture of HF and THF, or 1 M aqueous $HIO_4$ dissolved in THF.

Therefore, according to a very preferable embodiment of the invention the compound of general formula (III), preferably the compound with formula

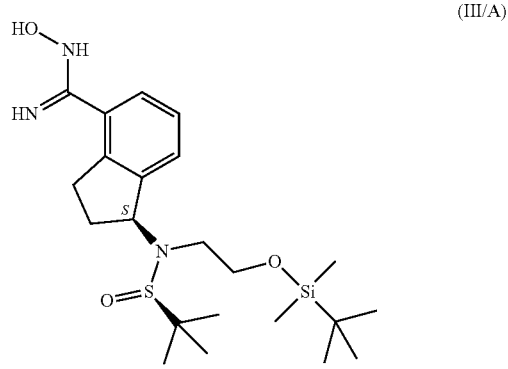

(III/A)

(III/A) is reacted with the compound of formula (VIII) in an aromatic solvent, preferably toluene or xylene, most preferably toluene, so that the compound of formula (VIII) is preferably activated with disubstituted carbodiimide, preferably with dicyclohexylcarbodiimide, 1-ethyl-3-(3-dimethylaminopropyl)carbodiimide in the presence of an organic base, more preferably in the presence of DIPEA (diisopropylethylamine), TEA (triethylamine), or with carbonyldiimidazole in the presence of hydroxybenzotriazole or with ethyl cyano glyoxylate-2-oxime, or with propanephosphonic acid anhydride (T3P), most preferably with propanephosphonic acid anhydride (T3P), then after the reaction has completed, if necessary the reaction mixture is washed with an aqueous base and/or saturated salt solution, then concentrated hydrochloric acid is added to the aromatic solvent, preferably toluene, solution and the ozanimod hydrochloride precipitating is isolated, and optionally purified.

The compound of general formula (III), preferably the compound of formula (III/A) and the compound of formula (VIII), the base and the activating reagents are combined at a temperature between 20-30° C., preferably between 20-25° C., then the temperature of the reaction mixture is raised preferably to between 60° C. and the boiling point of the solvent, preferably to between 65-100° C., most preferably to between 80-85° C. and maintained at that temperature until the reaction is complete, then the reaction mixture is cooled and then, if necessary, washed with an aqueous alkali, preferably with sodium or potassium hydrocarbonate solution, and, if necessary, with saturated sodium chloride solution, then the organic phase is reacted with concentrated hydrochloric acid solution (37%) preferably at a temperature of between 60° C. and the boiling point of the solvent, preferably between 65-85° C., most preferably between 70-75° C., then following this the reaction mixture is cooled, the precipitated crystals are filtered out, dried and optionally transformed into a base. In a preferable embodiment of the invention the ozanimod is precipitated in the form of hydrochloride salt, and transformed into crystalline ozanimod base.

Transformation into a base and the recrystallization of the base, if this is necessary, significantly increase the purity of the active substance. In other words transforming the hydrochloride salt into a base is a very preferable method for the purification of the active substance.

According to another embodiment of the invention, after being recrystallized from acetonitrile the very pure and stable Form I polymorph form of ozanimod is obtained.

The compound of general formula (III) used in the process according to the invention, in which formula R represents a protective group that may be removed in an acidic medium serving for the temporary protection of the hydroxyl group, preferably a substituted methyl ether type group, more preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, or 1-[2-(trimethylsilyl)ethoxy]ethyl group, a silyl ether type group, preferably a trimethylsilyl, triisopropylsilyl, t-butyldimethylsilyl or triphenylsilyl group, most preferably a t-butyldimethylsilyl group, is produced so that

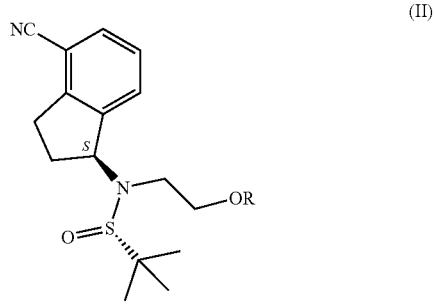

(II)

the compound of general formula (II), in which R represents the same as that stated above, most preferably a t-butyldimethylsilyl group, is reacted with hydroxylamine hydrochloride in an organic solvent in the presence of a base. A 1 to 4 carbon atom alcohol, preferably ethanol is used as the organic solvent in the reaction. A tertiary amine, preferably triethylamine or diisopropylethylamine is used as the organic base.

The compound of formula (II) used in the process according to the invention is produced by reacting

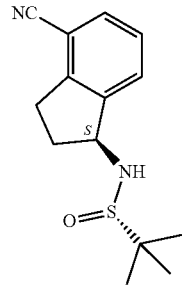

(VI)

the compound of formula (VI) in an organic solvent with a base, then reacting it with

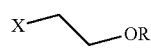

(VII)

the compound of formula (VII), in which formula R represents the same as the above, and X represents Cl, Br or I. Most preferably (2-bromoethoxy)-t-butyldimethylsilane is used as compound (VII). Preferably an amide type solvent, more preferably dimethylformamide, an ether type solvent, preferably tetrahydrofuran, acetonitrile or a mixture of the solvents listed, most preferably dimethylformamide is used as the solvent in the reaction of compound of formula (II) and the compound of general formula (VII). Sodium hydride, potassium tert-butoxide, caesium carbonate or hexamethyldisilazane, preferably sodium hydride is used as the base for the reaction of formula (II) and the compound of general formula (VII).

According to a very preferable embodiment of the invention the derivative of general formula (III) may also be produced from the compound of formula (VI) so that the compound of general formula (II) is not isolated.

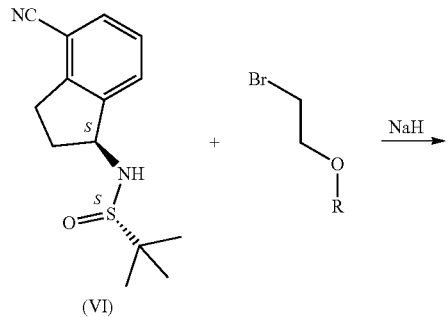

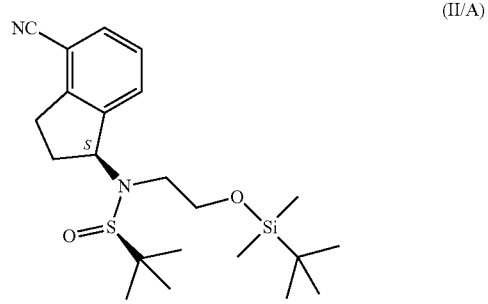

(III)

In this case the process preferably involves that when producing the compound of general formula (II), after the reaction has completed, when the compound of formula (VI) has run out, the reaction mixture containing the DMF and the surplus alkylating agent is extracted with a mixture of water and an ester type solvent, preferably water and ethyl acetate and the oil obtained by evaporating the ethyl acetate phase is, without further purification, dissolved in an alcohol type solvent, preferably a 1 to 4 carbon atom alcohol, most preferably ethanol and then reacted with hydroxylamine in the presence of a base. A mixture of water and ice is used as the water for the extraction.

Most preferably the process involves that (2-bromoethoxy)-t-butyldimethylsilane is used as the alkylating agent. Sodium hydride is used as the base during the alkylating process. The obtained (II/A)

compound of formula (II/A) is dissolved in ethanol and reacted with hydroxylamine hydrochloride in the presence of triethylamine.

Therefore, according to a very preferably embodiment of the process according to the invention mixture of a compound of general formula (IV), in which R represents a t-butyldimethylsilyl group as a protective group that may be removed in an acidic medium serving for the temporary protection of the hydroxyl group, and the compound of formula (V) are reacted in a 1 to 4 carbon atom alcohol, preferably 2-propanol, or in an aromatic solvent, preferably toluene with an inorganic acid, preferably hydrochloric acid and the ozanimod obtained is optionally transformed into a salt, preferably hydrochloride salt.

The compound of general formula (IV) used in the process, in which R represents a t-butyldimethylsilyl group, or the compound of formula (V) or a mixture of these is produced so that a.)

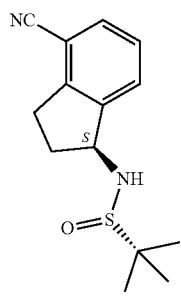

the compound of formula (VI) is reacted in organic dimethylformamide using sodium hydride as a base with

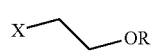

the compound of formula (VII), in which formula R represents a protective group that may be removed in an acidic medium serving for the temporary protection of the hydroxyl group, preferably a substituted methyl ether type group, more preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, or 1-[2-(trimethylsilyl)ethoxy]ethyl group, a silyl ether type group, preferably a trimethylsilyl, triisopropylsilyl, t-butyldimethylsilyl or triphenylsilyl group, most preferably a t-butyldimethylsilyl group, and X represents Cl, Br or I.

b.) The obtained

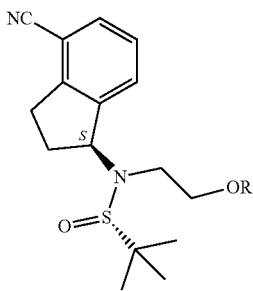

compound of formula (II), in which R represents a protective group that may be removed in an acidic medium serving for the temporary protection of the hydroxyl group, preferably a substituted methyl ether type group, more preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, or 1-[2-(trimethylsilyl)ethoxy]ethyl group, a silyl ether type group, preferably a trimethylsilyl, triisopropylsilyl, t-butyldimethylsilyl or triphenylsilyl group, most preferably a t-butyldimethylsilyl group, is reacted with hydroxylamine hydrochloride in an organic solvent, preferably in 1 to 4 carbon atom alcohol, most preferably ethanol, in the presence of a base, preferably an organic base, most preferably triethylamine, then c.) the obtained

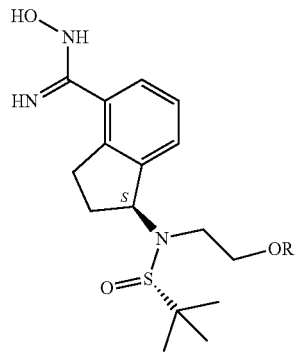

compound of general formula (III) is activated in an organic solvent in the presence of an organic base, preferably diisopropylethylamine or triethylamine with disubstituted carbodiimide, e.g. dicyclohexylcarbodiimide, 1-ethyl-3-(3-dimethylaminopropyl)carbodiimide or with carbonyl-diimidazole in the presence of hydroxybenzotriazole or ethyl cyano glyoxylate-2-oxime, or with propanephosphonic acid anhydride (T3P), then the activated compound is reacted with the formula (VIII) 3-cyano-4-(i-propyloxi)benzoic acid. Preferably amide, aromatic, ether, ester, nitrile or sulfoxide type solvents are used as the organic solvent, most preferably dimethylformamide is used as the amide type solvent, most preferably toluene is used as the aromatic solvent, most preferably tetrahydrofuran or dioxane is used as the ether type solvent, acetonitrile is used as the nitrile type solvent, dimethyl sulfoxide is used as the sulfoxide type solvent, so that the reaction is carried out at a temperature between 0-100° C., preferably between 50-100° C., most preferably between 85-90° C., so that the formula (VIII) 3-cyano-4-(i-propyloxy)benzoic acid is activated at a temperature between room temperature and 100° C., preferably between 50-100° C., most preferably between 85-90° C., most preferably in ethyl acetate or toluene with propanephosphonic acid anhydride (T3P) in the presence of triethylamine.

The object of the invention also relates to a process for the purification of the ozanimod salts of formula (I), preferably hydrochloride salt in such a way that ozanimod of formula (I) is isolated from the reaction mixture as a base, or its acid addition salt, preferably hydrochloride salt, is transformed into a base, if necessary the base is recrystallized, then the purified base obtained is crystalized, and if necessary transformed into an acid addition salt, preferably into hydrochloride salt by using hydrochloric acid. A halogenated hydrocarbon, preferably dichloromethane, an aromatic solvent, most preferably toluene, or a nitrile type solvent, preferably acetonitrile is used as the solvent.

By using acetonitrile, in an exceptionally preferable way a novel crystalline polymorph form of ozanimod is precipitated. The positions of the characteristic x-ray powder diffraction peaks of the novel crystalline polymorphic form, the ozanimod base Form I are as follows [° 2θ±0.2θ]: 5.77; 11.56; 15.36; 19.54; 27.00, preferably [° 2θ±0.2θ]: 5.77; 11.56; 12.98; 13.38; 13.90; 15.36; 16.23; 19.54; 25.37; 27.00, even more preferably [° 2θ±0.2θ]: 2.86; 5.77; 8.66; 10.77; 10.87; 11.14; 11.56; 12.20; 12.98; 13.38; 13.90; 14.59; 15.36; 16.23; 17.19; 17.43; 17.73; 18.44; 18.94; 19.54; 20.28; 20.41; 21.10; 21.65; 21.87; 22.10; 22.43; 22.79; 23.36; 23.75; 23.95; 24.62; 25.37; 26.16; 27.00; 27.90; 28.86; 29.20; 29.85; 31.00; 31.62; 32.85; 33.13; 34.33.

The characteristic x-ray powder diffraction peaks are summarised in the following table:

| Peak | 2θ (°) | d (Å) | Relative intensity (%) |
|---|---|---|---|
| 1 | 2.86 | 30.90 | 28 |
| 2 | 5.77 | 15.32 | 100 |
| 3 | 8.66 | 10.22 | 21 |
| 4 | 10.77 | 8.22 | 13 |
| 5 | 10.87 | 8.14 | 8 |
| 6 | 11.14 | 7.94 | 14 |
| 7 | 11.56 | 7.65 | 28 |
| 8 | 12.20 | 7.25 | 9 |
| 9 | 12.98 | 6.82 | 42 |
| 10 | 13.38 | 6.62 | 97 |
| 11 | 13.90 | 6.37 | 34 |
| 12 | 14.59 | 6.07 | 24 |
| 13 | 15.36 | 5.77 | 14 |
| 14 | 16.23 | 5.46 | 45 |
| 15 | 17.19 | 5.16 | 12 |
| 16 | 17.43 | 5.09 | 4 |
| 17 | 17.73 | 5.00 | 9 |
| 18 | 18.44 | 4.81 | 6 |
| 19 | 18.94 | 4.69 | 13 |
| 20 | 19.54 | 4.54 | 37 |
| 21 | 20.28 | 4.38 | 8 |
| 22 | 20.41 | 4.35 | 2 |
| 23 | 21.10 | 4.21 | 4 |
| 24 | 21.65 | 4.11 | 24 |
| 25 | 21.87 | 4.07 | 6 |
| 26 | 22.10 | 4.02 | 11 |
| 27 | 22.43 | 3.97 | 19 |
| 28 | 22.79 | 3.90 | 6 |
| 29 | 23.36 | 3.81 | 31 |
| 30 | 23.75 | 3.75 | 11 |
| 31 | 23.95 | 3.72 | 16 |
| 32 | 24.62 | 3.62 | 61 |
| 33 | 25.37 | 3.51 | 55 |
| 34 | 26.16 | 3.41 | 28 |
| 35 | 27.00 | 3.30 | 41 |
| 36 | 27.90 | 3.20 | 26 |
| 37 | 28.86 | 3.09 | 12 |
| 38 | 29.20 | 3.06 | 2 |
| 39 | 29.85 | 2.99 | 1 |
| 40 | 31.00 | 2.89 | 2 |

Figure 3:
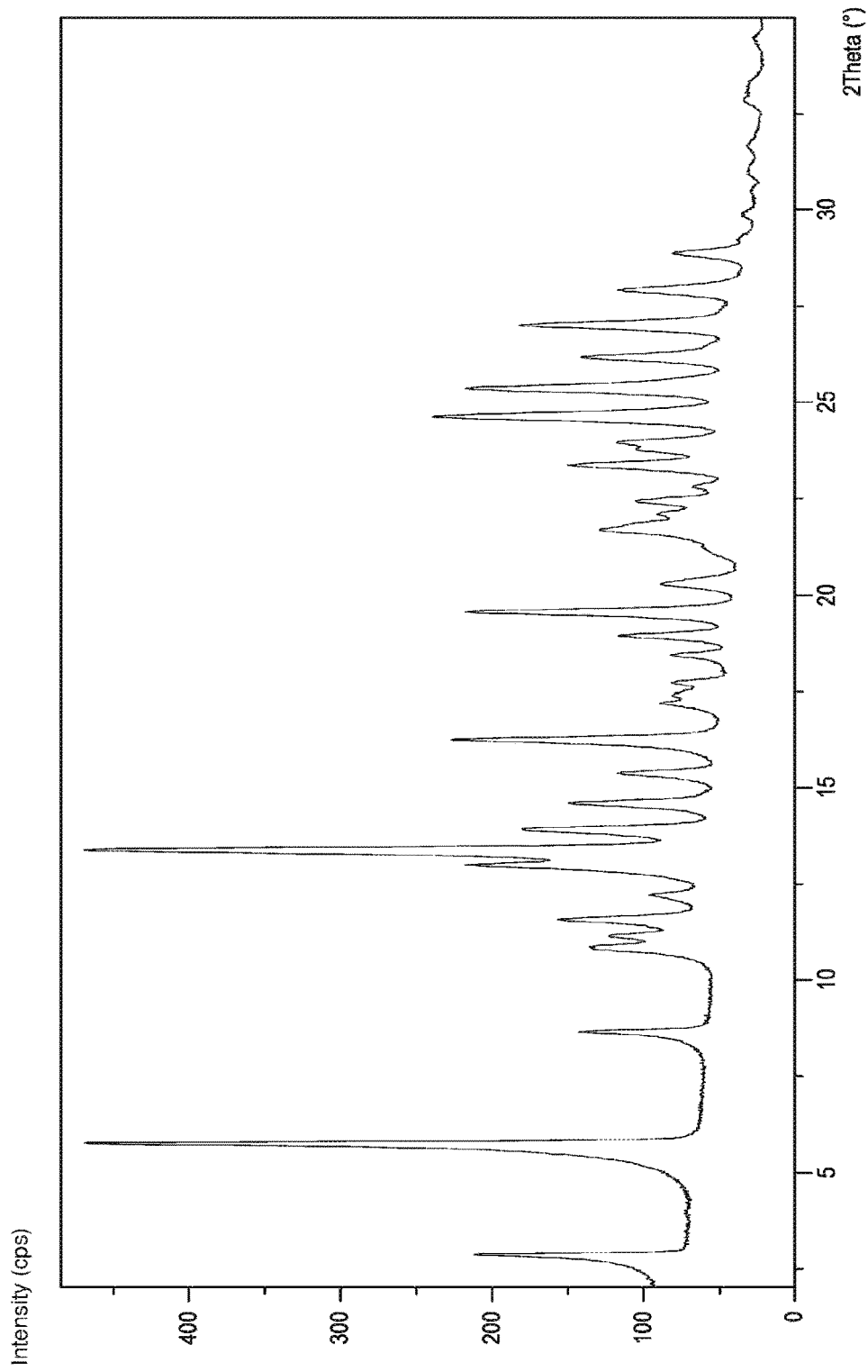

FIG. 3 shows the x-ray powder diffractogram of the Form I polymorph ozanimod base according to the invention.

The Form I polymorph ozanimod base according to the invention has sufficient stability for even long-term storage, or as raw material for a pharmaceutical preparation. According to our tests the humidity of the air does not influence the stability of the crystals, their polymorphic nature does not change, so in the case the product is used as an active substance the polymorphic nature, and so the dissolution and absorption conditions, biological efficacy are not expected to change.

The Form I polymorph ozanimod base according to the invention may be most preferably produced by suspending ozanimod in acetonitrile, then by heating the suspension obtained the ozanimod base is dissolved, any solid contaminants are optionally filtered out, if necessary the solution is allowed to settle, then the solution obtained is cooled and the precipitated crystals are preferably redissolved by repeated heating, then after cooling the solution once again the precipitated ozanimod Form I polymorph is filtered, and optionally washed with cold acetonitrile.

The monitoring of the reactions disclosed in the invention and the testing of the intermediate products is performed using flash chromatography, with a Shimadzu LC-MS device. The samples were dissolved in a water-acetonitrile 80:20 mixture, and tested using a neutral (in an ammonium-acetate buffer solution), and an acidic (in a formic acid solution) method.

The process according to the invention is summarised in the following figure:

FIG. 3

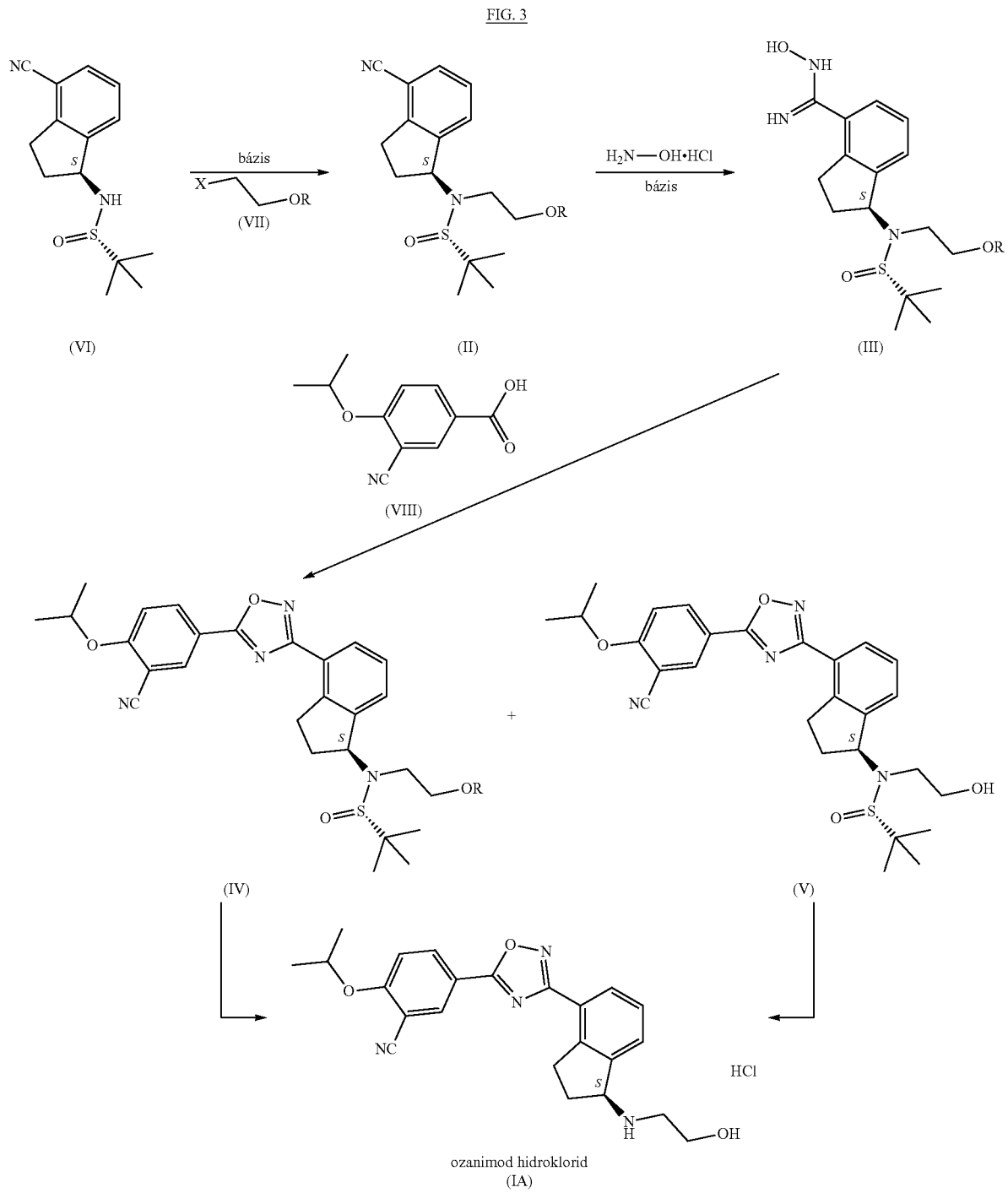

According to the most general form of implementation of the invention, the compound of formula (VI) is transformed into the compound of formula (II) in the presence of a base, in which R represents that given above. Following this, the compound of general formula (II) is reacted with hydroxylamine, preferably hydroxylamine hydrochloride in the presence of a base, then the compound of general formula (II) obtained is reacted with the compound of formula (VIII), and the compounds of general formula (IV) and (V) formed under the reaction conditions, or a mixture of these are transformed into ozanimod hydrochloride of formula (IA) by the cleaving of the protective groups.

Therefore the object of the invention relates to the process presented in FIG. 3 overall and to each step as well, as well as to the following novel intermediates:

Compound of general formula (IV), in which R represents a protective group that may be removed in an acidic medium serving for the temporary protection of the hydroxyl group, preferably R is a substituted methyl ether type compound, such as a methoxymethyl, benzyloxymethyl, p-methoxybenzyloxymethyl, [(3,4-dimethoxybenzyl)oxy]methyl group, a tetrahydropyranyl group, or a substituted ethyl ether type group, such as an ethoxyethyl, or 1-[2-(trimethylsilyl)ethoxy]ethyl group, a silyl ether type group, such as a trimethylsilyl, triisopropylsilyl, t-butyldimethylsilyl or triphenylsilyl group, most preferably a t-butyldimethylsilyl group.

Compound of general formula (II), in which R represents a protective group that may be removed in an acidic medium serving for the temporary protection of the hydroxyl group, preferably a substituted methyl ether type group, more preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, a 1-[2-(trimethylsilyl)ethoxy]ethyl group, a silyl ether type group, preferably a trimethylsilyl, triisopropylsilyl, t-butyldimethylsilyl or triphenylsilyl group, most preferably a t-butyldimethylsilyl group.

The compound of formula

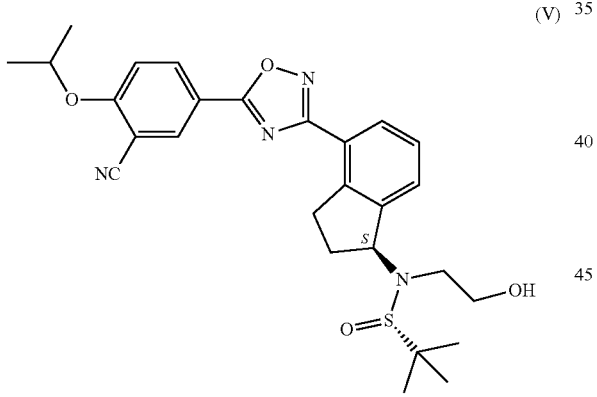

(V)

The compound of formula

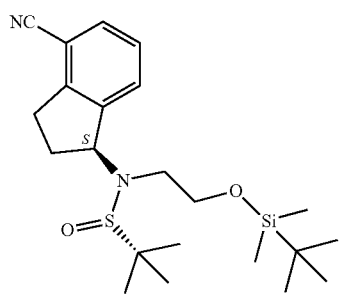

(IIA)

The compound of general formula

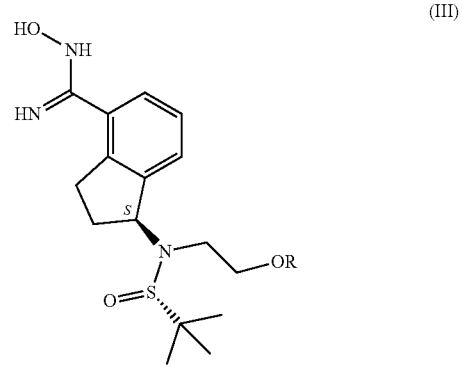

(III)

(III), in which R represents preferably a substituted methyl ether type group, more preferably a methoxymethyl, benzyloxymethyl, p-methoxybenzyloxymethyl, or [(3,4-dimethoxybenzyl)oxy]methyl group, a tetrahydropyranyl group, or a substituted ethyl ether type group, preferably an ethoxyethyl, a 1-[2-(trimethylsilyl)ethoxy]ethyl group, a silyl ether type group, preferably a trimethylsilyl, triisopropylsilyl, t-butyldimethylsilyl or triphenylsilyl group, most preferably a t-butyldimethylsilyl group.

The compound of formula (IIIA)

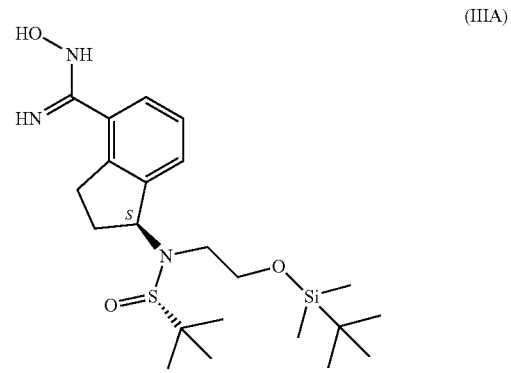

(IIIA)

The compound of formula (IV):

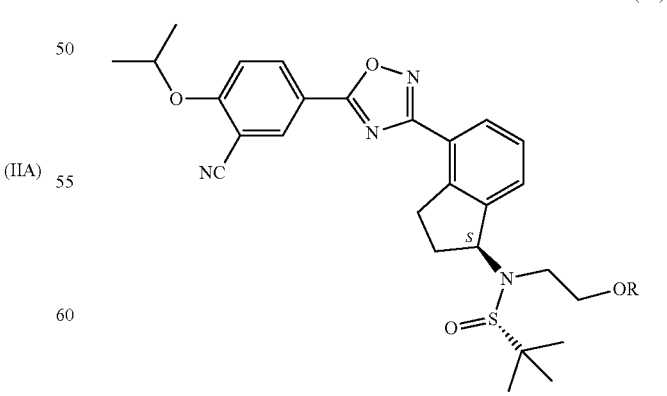

(IV)

in which R represents preferably a substituted methyl ether type group, more preferably a methoxymethyl, benzyloxymethyl, p-methoxybenzyloxymethyl, or [(3,4-dimeth oxybenzyl)oxy]methyl group, a tetrahydropyranyl group, or a substituted ethyl ether type group, preferably an ethoxyethyl, a 1-[2-(trimethylsilyl)ethoxy]ethyl group, a silyl ether type group, preferably a trimethylsilyl, triisopropylsilyl, t-butyldimethylsilyl or triphenylsilyl group, most preferably a t-butyldimethylsilyl group.

The compound of formula (IVA)

The compound of formula (V)

and a mixture in any proportion of the compounds of formulas (IV) and (V).

The Advantages of the Invention

The synthesis pathway according to the invention is significantly more efficient, and from the point of view of industrial implementation it is more preferably than the processes in the literature for the production of the ozanimod active substance. The replacement of the (S)-2-methylpropane-2-sulfinyl group for the t-butoxycarbonyl group has been rendered unnecessary in the process, thereby making the synthesis pathway significantly shorter.

Furthermore by using the process according to the invention, the yield of the process is significantly greater, and the energy demand drops.

Another advantage of the invention is that corresponding diastereomer contaminants are also formed from the undesired diastereomer formed during the reduction of the Schiff base (B) in the course of the following synthesis steps, the purification and analytical testing of which is significantly simpler than that of the known enantiomer mixtures known of from the processes in the literature.

A further advantage of the process is that if the compounds of formulas (I) and (IA) are produced from the compound of general formula (III), preferably from the compound of formula (III/A) and the compound of formula (VIII), then it is surprising to experience that by using an aromatic solvent, preferably toluene or xylene, most preferably toluene the ring closure and the removal of the protective groups may be performed in the same reaction mixture without changing the solvent, which, on the one part, reduces costs, and, on the other part, significantly reduces the load on the environment as well.

Another advantage of the invention is that the use of the base according to the invention, preferably the Form I polymorphic base, makes it possible to extract a product of a purity that is appropriate for use as a medicine without any further purification steps being necessary.

FIGURES

Figure 2:
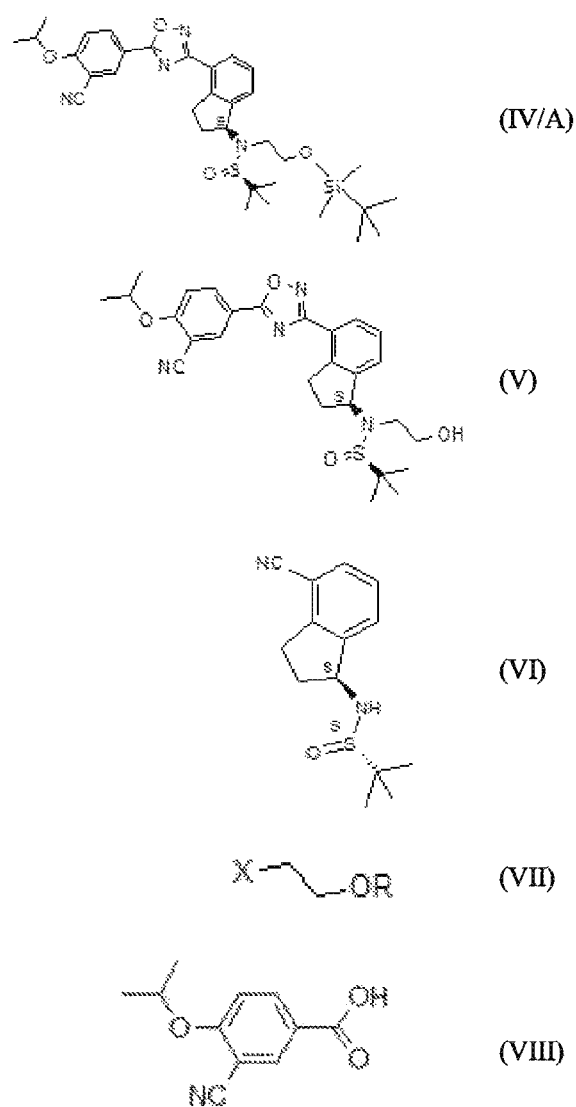

FIGS. 1 and 2: the formulas of the intermediates and reagents of the present process FIG. 3: The x-ray powder diffractogram of the ozanimod base Form I form FIG. 4: The water sorption isotherm of the ozanimod base Form I form at 25° C.

Figure 5:
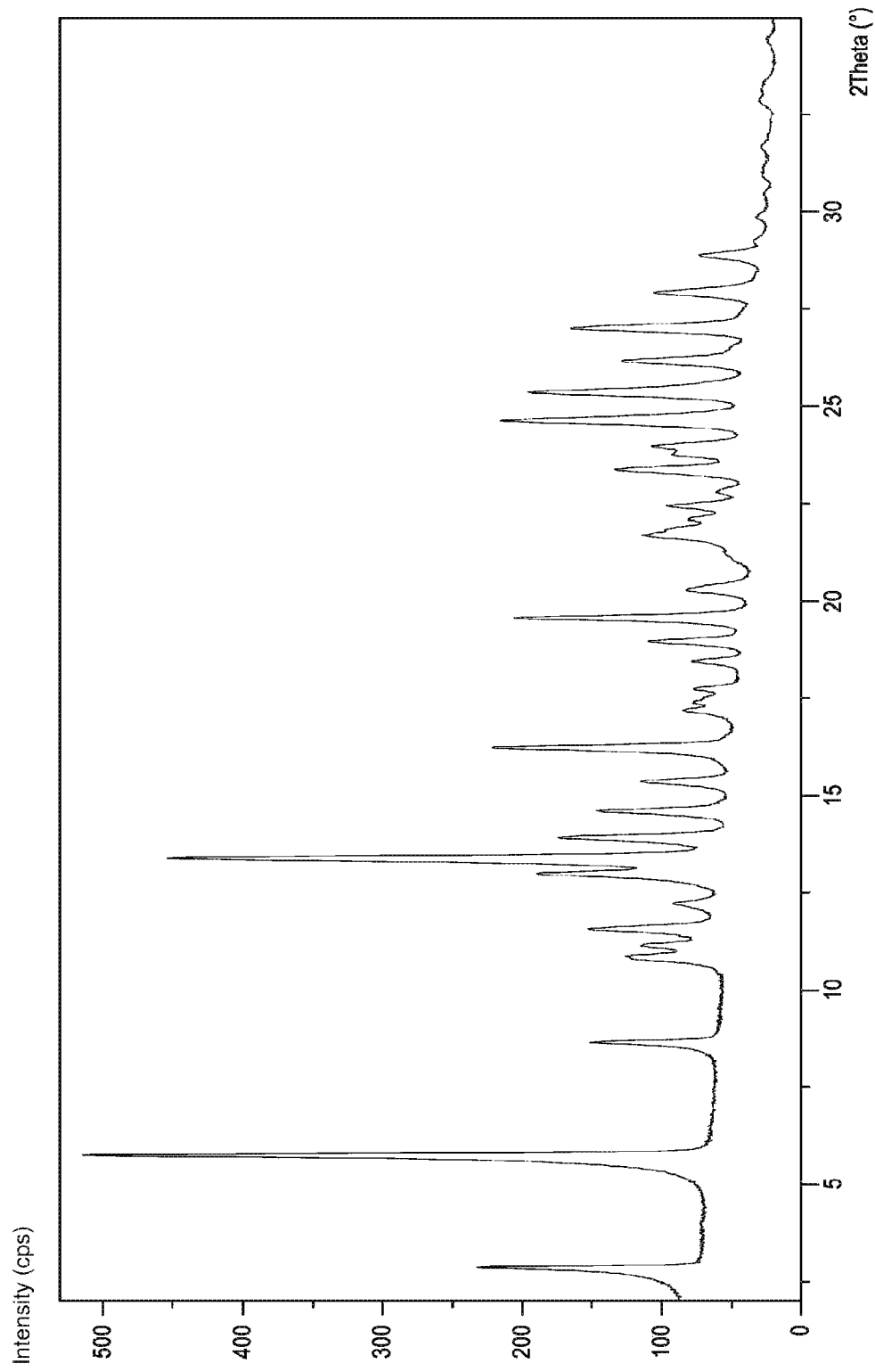

FIG. 5: The x-ray powder diffractogram of the ozanimod base Form I form after two DVS cycles (see example 6).

The invention is henceforward illustrated with the following examples without limiting the scope of protection to the examples.

EXAMPLES

The Chromatographic Purification Method Used:

The extraction of the individual components from the mixtures was performed using a column chromatography method, with a Teledyne ISCO CombiFlash Rf chromatograph, in RediSep Rf columns with a hexane-ethyl acetate eluent mixture, gradient used: 0-140 min. hexane: ethyl-acetate 100:0-34:66; 140-160 min. 34:66-0:100.

The $^1$H NMR spectra were recorded using a Varian Gemini 200, Bruker Avance III, and an Inova 500 spectrometer in CDCl$_3$ or DMSO-d$_6$ solvents, using the tetramethylsilane (TMS) internal standard. The chemical displacements (δ) were given in parts per million (ppm) units, and the coupling constants (J) were given in hertz (Hz).

At least 95% pure standards were made of the diastereomer contaminants using similar processes to those used when producing the ozanimod intermediates. The monitoring of the reactions and the testing of the intermediates were performed using a flash chromatography method, on a Shimadzu LC-MS device. The samples were dissolved in a water-acetonitrile 80:20 mixture, and tested using a neutral (in an ammonium-acetate buffer solution), and an acidic (in a formic acid solution) method.

The x-ray powder diffraction measurements were performed as follows:
X-Ray Powder Diffraction Measurement Conditions
Device: PANalytical Empyrean x-ray powder diffractometer
Measurement alignment: Transmission
X-Ray Tube
Type: Empyrean long fine focussing, high resolution tube
Anode: Cu
Wavelength: Kα(1.541874 Å)
Focus: line focus
Source-Side Optical Elements
Divergence slit: Fixed slit 1/2°

Mirror: Focussing elliptical mirror
Soller slit: 0.04 rad
Diffusion inhibitor slit: Fixed slit 1/2°
Diffracted Side Optical Elements
Diffusion inhibitor slit: Programmable slit in fixed mode: 1/2°
Soller slit: 0.04 rad
Sample Table
Type: Reflection-transmission, with rotatable sample holders
Sample rotation speed: 1 rotation/second
Direct beam catcher
("beam knife"): Transmission
Detector
Type: PIXcel 3D 1×1 area detector
Operation mode: Scanning line detector (ID) operation mode
Active detector window
size: 3.3473°
Sample preparation: samples placed between two Mylar sheets, without pulverising
Measurement Conditions
Temperature: room temperature
Accelerating voltage: 45 kV
Anode heating current: 40 mA
Scanning method: continuous (θ/θ) scanning
Measurement range: 2.0000-34.9964° 2θ
Step gap: 0.0131°2θ
Step duration: 109.650 seconds
No of measurement cycles: 1
Measurement duration: ~20 minutes
Dynamic Vapour Sorption (DVS)
Device: TA Q5000SA dynamic vapour sorption analyser (DVS)
Atmosphere: Flowing nitrogen
Carrier gas flow rate: 200 mL/min $N_2$
Solvent: Water
Balance house flow rate: 10 mL/min $N_2$
Temperature maintained
  35° C.
in balance house:
Crucible type: Platinum 100 μl, open
Measuring method: Custom
Predrying: None
Measuring temperature: 25° C., isotherm
Measurement range: Between 0% and 95% RH
Initial relative humidity: 20% RH
Measurement phases: Desorption-adsorption-desorption
Step size: 5% RH
Mass constant criterion: ≤0.01% for 5 minutes
Maximum step length: 360 minutes
Sampling frequency: 5 sec/point
Number of cycles: 2

Example 1

(S)—N-{2-[(tert-butyldimethylsilyl)oxy]ethyl}-N-[(1S)-4-cyano-2,3-dihydro-1H-inden-1-yl]-2-methyl-propan-2-sulfinamide (IIA)

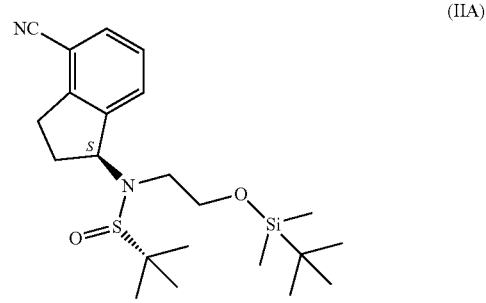

(IIA)

Sodium hydride (4.85 g; 60% dispersion in oil; 121.2 mmol) is measured into a 500 ml multi-neck flask in an argon atmosphere, dimethylformamide is added at room temperature (30 ml), then cooled to 0° C., and a dimethylformamide (30 ml) solution of (S)—N-[(1S)-4-cyano-2,3-dihydro-1H-inden-1-yl]-2-methylpropane-2-sulfinamide (VI (see WO 2011060392) 7.96 g; 30.3 mmol) is added to it drop by drop; is added to it drop by drop. (2-Bromoethoxy)(tert-butyl)dimethylsilane ((VIIA), 30.0 g 97%; 33.0 ml; 121.6 mmol) is added to it drop by drop. Then the mixture is left to warm up to room temperature and stirred. Then saturated sodium hydrogen carbonate solution is added to the reaction mixture. While being stirred it is diluted with water and ethyl acetate, the phases are separated, the organic phase is washed with water (2×150 ml), and dried on magnesium sulphate, and evaporated in a vacuum. The oil obtained in this way is used in the following synthesis step without purification.

$^1$H NMR (CDCl$_3$, 400 MHz) δ7.58 (1H, d, J=7.6 Hz), 7.54 (1H, d, J=7.6 Hz), 7.32 (1H, t, J=7.6 Hz), 5.15 (1H, t, J=7.6 Hz), 3.58-3.72 (2H, m), 3.18-3.26 (1H, ddd, J=12.3, 9.3, 3.9 Hz), 3.08-3.16 (1H, m), 3.05 (1H, t, J=8.4 Hz), 2.92-3.02 (1H, m), 2.47-2.57 (1H, m), 2.25-2.36 (1H, m), 1.23 (9H, s), 0.85 (9H, s), 0.05 (6H, s).

Example 2

(1S)-1-({2-[(tert-butyldimethylsilyl)oxy]ethyl}[(S)-2-methylpropane-2-sulfinyl]amino)-N-hydroxy-2,3-dihydro-1H-indene-4-carboximidamide (IIIA)

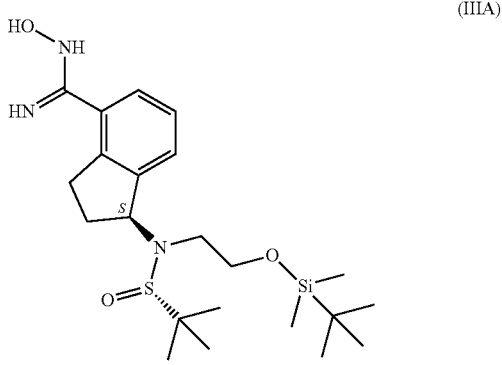

(IIIA)

In a 500 ml single-neck flask under an argon atmosphere at 25° C. ethanol (128 ml), triethylamine (12.5 ml; 9.1 g; 91.0 mmol), and hydroxylamine hydrochloride (6.32 g; 91.0 mmol) are added to the (S)—N-{2-[(tert-Butyldimethylsilyl)oxy]ethyl}-N-[(1S)-4-cyano-2,3-dihydro-1H-inden-1-yl]-2-methylpropan-2-sulfinamide (IIA) obtained in the previous step, the mixture is heated to 50° C., then stirred at this temperature for approximately 6 hours. The reaction mixture is evaporated, then water and dichloromethane are added to the evaporation residue, the phases are then separated, the organic phase is washed with water (200 ml), and then with saturated sodium chloride solution, and then dried and evaporated. The evaporation residue is washed with diisopropylether (60 ml), the crystalline material is filtered off, washed with cold diisopropylether (10 ml), thereby producing 14.7 g (82% yield calculated for (VI) (S)—N-[(1S)-4-cyano-2,3-dihydro-1H-inden-1-yl]-2-methylpropane-2-sulfinamide) of white crystals.

¹H NMR (CDCl₃, 400 MHz) δ7.43 (1H, d, J=7.6 Hz), 7.41 (1H, d, J=7.6 Hz), 7.27 (1H, m), 5.11 (1H, t, J=7.6 Hz), 4.82 (2H, bs), 3.58-3.72 (2H, m), 3.20-3.30 (1H, ddd, J=12.3, 9.3, 3.9 Hz), 3.10-3.20 (1H, m), 2.95-3.05 (2H, m), 2.38-2.48 (1H, m), 2.14-2.26 (1H, m), 1.25 (9H, s), 0.86 (9H, s), 0.01 (6H, s).

Example 3

The production of the mixture of (S)—N-{2-[(tert-butyldimethylsilyl)oxy]ethyl}-N-[(1S)-4-{5-[3-cyano-4-(propan-2-yloxy)phenyl]-1,2,4-oxadiazol-3-yl}-2,3-dihydro-1H-inden-1-yl]-2-methylpropane-2-sulfinamide (IVA) and ((S)—N-[(1S)-4-{5-[3-cyano-4-(propan-2-yloxy)phenyl]-1,2,4-oxadiazol-3-yl}-2,3-dihydro-1H-inden-1-yl]-N-(2-hydroxyethyl)-2-methylpropane-2-sulfinamide (V)

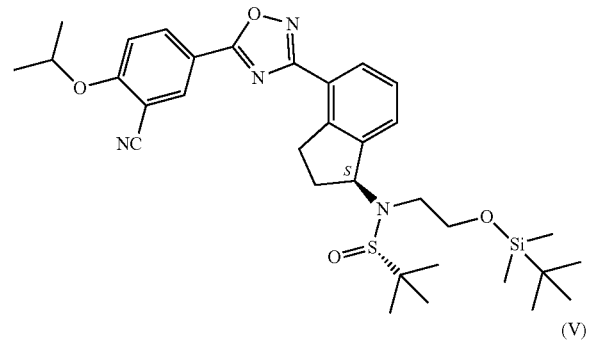

(IVA)

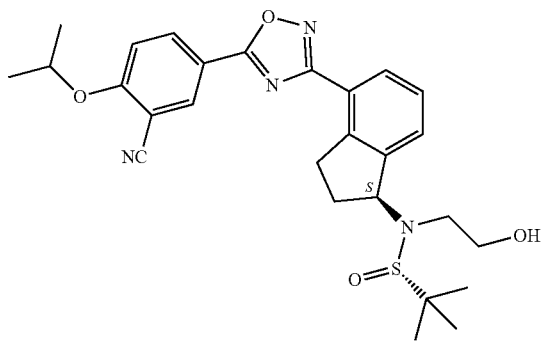

(V)

The (S)—N-{2-[(tert-butyldimethylsilyl)oxy]ethyl}-N-[(1S)-4-{5-[3-cyano-4-(propan-2-yloxy)phenyl]-1,2,4-oxadiazol-3-yl}-2,3-dihydro-1H-inden-1-yl]-2-methylpropane-2-sulfinamide ((IIIA); 12.25 g; 27.0 mmol) is added to a multi-neck 500 ml device in an argon atmosphere at 25° C., while being stirred it is dissolved with toluene (220 ml), and 3-cyano-4-(propan-2-yloxy)benzoic acid ((VIII); 8.31 g; 40.5 mmol) and triethylamine (13.65 g; 18.7 ml; 135 mmol) are added, and then the T3P is added drop by drop (17.16 g 50% solution; 16.0 ml; 27.0 mmol). The reaction mixture obtained in this way is stirred at 85-90° C., then cooled to room temperature, then water is added and the phases are separated. The organic phase is washed with saturated sodium hydrogen carbonate solution, dried and then evaporated in a vacuum. The mixture obtained in this way, which contains the (S)—N-{2-[(tert-butyldimethylsilyl)oxy]ethyl}-N-[(1S)-4-{5-[3-cyano-4-(propan-2-yloxy)phenyl]-1,2,4-oxadiazol-3-yl}-2,3-dihydro-1H-inden-1-yl]-2-methylpropane-2-sulfinamide (IVA) and the (S)—N-[(1S)-4-{5-[3-cyano-4-(propan-2-yloxy)phenyl]-1,2,4-oxadiazol-3-yl}-2,3-dihydro-1H-inden-1-yl]-N-(2-hydroxyethyl)-2-methylpropan-2-sulfinamide (V) formed from it, is used in the next synthesis step without purification.

Using the acidic method disclosed in the descriptive part, in a Shimadzu LC-MS device the IVA compound comes at a retention time of RT: 6.31 min, and the V compound at a retention time RT: 4.24 min.

Column chromatography separation was used to identify the components of the mixture, according to the method given in the descriptive part, the retention time of the (IVA) compound: 56 min.

(IVA) (sample purified with chromatographic process):

¹H NMR (CDCl₃, 400 MHz) δ8.44 (1H, d, J=2.1 Hz), 8.35 (1H, dd, J=8.9, 2.2 Hz), 8.11 (1H d, J=7.6 Hz), 7.53 (1H, d, J=7.6 Hz), 7.39 (1H, t, J=7.6 Hz), 7.17 (1H, d, J=8.9 Hz), 5.18 (1H, t, J=7.6 Hz), 4.80 (1H, quint, J=6.0 Hz), 3.58-3.72 (2H, m), 3.20-3.30 (1H, ddd, J=12.3, 9.3, 3.9 Hz), 3.10-3.20 (1H, m), 2.95-3.05 (2H, m), 2.50-2.60 (1H, m), 2.25-2.38 (1H, m), 1.48 (6H, d, J=6.0 Hz), 1.25 (9H, s), 0.86 (9H, s), 0.01 (6H, s).

(V) (sample purified with chromatographic process): according to the method given in the descriptive part, the retention time of the V compound: 145 min.

¹H NMR (CDCl₃, 400 MHz) δ8.43 (1H, d, J=1.8 Hz), 8.33 (1H, dd, J=8.8, 1.9 Hz), 8.13 (1H d, J=7.5 Hz), 7.58 (1H, d, J=7.1 Hz), 7.42 (1H, t, J=7.5 Hz), 7.13 (1H, d, J=8.8 Hz), 5.11 (1H, t, J=7.6 Hz), 4.80 (1H, quint, J=6.0 Hz), 3.46-3.50 (5H, m), 3.25-3.29 (2H, m), 2.55-2.59 (1H, m), 2.35-2.38 (1H, m), 1.53 (1H, s); 1.48 (5H, d, J=6.0 Hz), 1.26 (9H, s).

Example 4

5-{3-[(1S)-1-[(2-Hydroxyethyl)amino]-2,3-dihydro-1H-inden-4-yl]-1,2,4-oxadiazol-5-yl}-2-(propan-2-yloxy)benzonitrile Hydrochloride (Ozanimod Hydrochloride, Hydrochloride Salt of Compound (I))

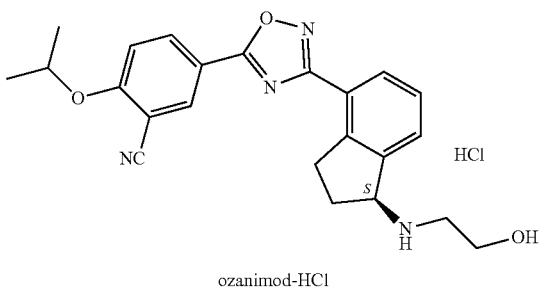

ozanimod-HCl a) Process

The mixture (11.2 g) obtained according to example 3 is stirred with 2-propanol (80 ml) until a homogenous solution is obtained, then 2-propanol hydrogen chloride solution (20.25 ml; 6.35 mmol/ml; 128.6 mmol) at room temperature is added to it drop by drop, the mixture is then stirred at 50° C., then cooled, then stirred again for 2 hours at 0-5° C. The precipitated crystals are filtered out, washed with 2-propanol, thereby 6.2 g (yield calculated for IIIA (S)—N-{2-[(tert-butyldimethylsilyl)oxy]ethyl}-N-[(1S)-4-{5-[3-cyano-4-(propan-2-yloxy)phenyl]-1,2,4-oxadiazol-3-yl}-2,3-dihydro-1H-inden-1-il]-2-methylpropane-2-sulfinamide is 52%) ozanimod hydrochloride is obtained. The gross yield of the synthesis performed without extracting the intermediate products (B), (IIA), (IVA) and (V) calculated for the initial material 1-oxo-2,3-dihydro-1H-indene-4-carbonitrile (A) is 26.6%.

$^1$H NMR (DMSO-$d_6$, 400 MHz) δ9.19 (2H, bs), 8.53 (1H, d, J=2.3 Hz), 8.41 (1H, dd, J=9.9, 2.3 Hz), 8.16 (1H, d, J=7.2 Hz), 7.95 (1H, d, J=7.5 Hz), 7.58 (2H, m), 5.28 (1H, t, J=5.0 Hz), 4.99 (1H, quint, J=6.0 Hz), 4.90 (1H, m), 3.71 (2H, q, J=5.0 Hz), 3.47 (1H, m), 3.35 (2H, m), 3.05 (1H, m), 3.00 (1H, m), 2.32 (1H, m), 1.39 (6H, d, J=6.0 Hz).

b) Process

The (S)—N-{2-[(tert-butyldimethylsilyl)oxy]ethyl}-N-[(1S)-4-{5-[3-cyano-4-(propan-2-yloxy)phenyl]-1,2,4-oxadiazol-3-yl}-2,3-dihydro-1H-inden-1-yl]-2-methylpropane-2-sulfinamide (IVA; 220 mg; 0.353 mmol) is stirred with 2-propanol (1.5 ml) until a homogenous solution is obtained, then concentrated hydrochloride acid solution (37%; 0.1 ml) is added to it drop by drop at room temperature, the reaction mixture is then stirred at 50° C. and cooled, and once again stirred for 2 hours at 0-5° C. The precipitated crystals are filtered out, washed with 2-propanol, thereby producing 120 mg (77%) ozanimod hydrochloride.

c) Process

The (S)—N-[(1S)-4-{5-[3-cyano-4-(propan-2-yloxy)phenyl]-1,2,4-oxadiazol-3-yl}-2,3-dihydro-1H-inden-1-yl]-N-(2-hydroxyethyl)-2-methylpropane-2-sulfinamide (V; 114 mg; 0.224 mmol) is stirred with 2-propanol (1.0 ml) until a homogenous solution is obtained, then concentrated hydrochloric acid (37%; 0.05 ml) is added to it at room temperature, and then the reaction mixture is stirred at room temperature, then cooled and stirred once again for 2 hours at 0-5° C. The precipitated crystals are filtered out, washed with 2-propanol, thereby producing 89 mg (90%) ozanimod hydrochloride.

Example 5

The production of ozanimod hydrochloride (one pot process):

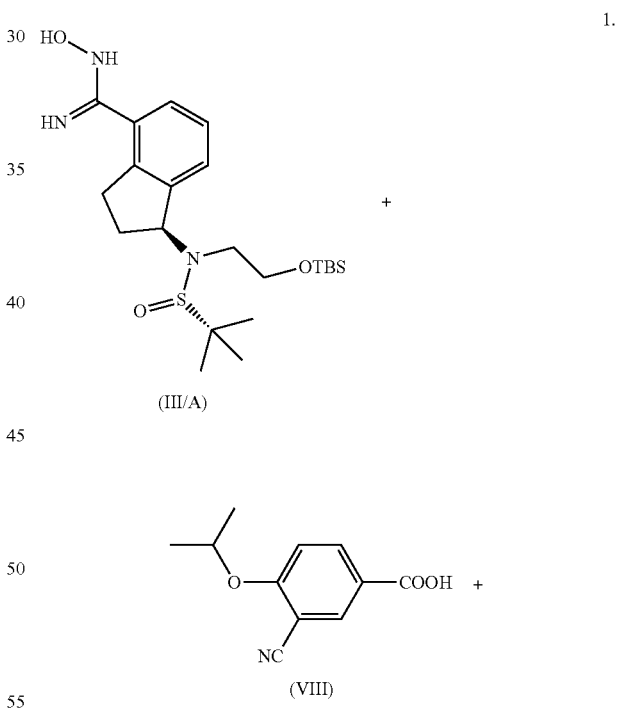

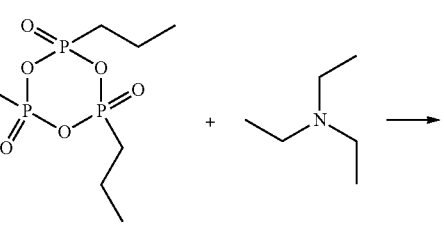

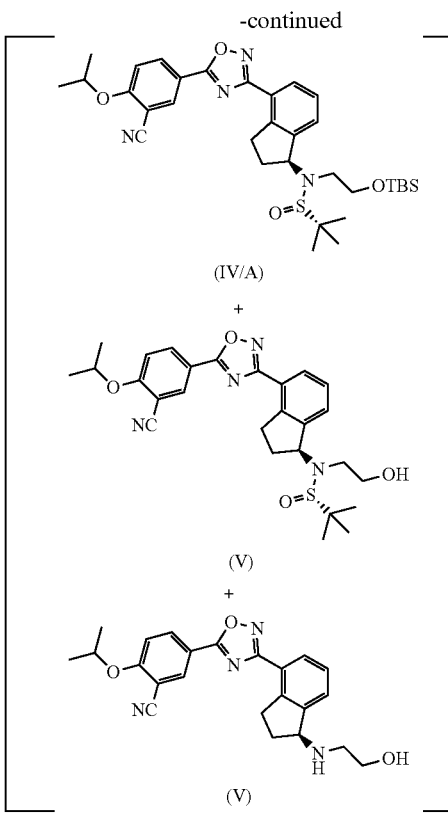

Reaction:

Coupling and the production of raw hydrochloride:

13.75 g (30.3 mmol) compound of formula (III/A) is measured into a 500-ml multi-neck flask fitted with a gas inlet, cooler, bubbler, dropper funnel and thermometer at 25° C. in an argon atmosphere in 80.0 ml of absolute toluene, 6.22 g (30.3 mmol) compound of formula (VIII) and 21.0 ml (15.33 g; 151.5 mmol) $Et_3N$ are added to the suspension obtained while stirring and 9.0 ml (15.15 mmol) T3P 50% in ethyl acetate solution is added to it drop by drop. The solution obtained is heated to 90° C., and then stirred at this temperature until the compound of formula (III/A), the precursor of compound of formula (IV/A) and the precursor of compound of formula (V) can be detected in the reaction mixture on the basis of LC-MS.

The reaction mixture is allowed to cool to room temperature. The phases are then separated, and the organic phase is washed with 2×70 ml saturated NaCl solution. The toluene phase is heated to 85° C., and during intensive stirring 10.0 ml (4 equiv., 121.2 mmol) 37% aqueous hydrochloric acid solution is added drop by drop. The temperature increases to 90° C., and within a short time the crystals start to precipitate. Stirring is continued at this temperature until the compound of formula (IV/A) (M+H: 623), the compound of formula (V) (M+H: 509), and the O-silylated ozanimod derivative (M+H: 519) can be detected on the basis of LC-MS. Following this the reaction mixture is left to cool to room temperature while being stirred, then cooled to 0-5° C. with the stirring being continued for 1 hour.

The crystalline product is filtered, and washed with 3×10 ml cold toluene. Thereby producing 8.5 g (63.6%) ozanimod hydrochloride.

Example 6

The production of the Form I polymorph of ozanimod base: 3.60 g raw ozanimod hydrochloride is suspended in a mixture of 58 ml dichloromethane and 35 ml water, while stirring 9 ml 2 M $NaHCO_3$ solution is added drop by drop. The phases are separated, and the organic phase is evaporated until dry. The 1.85 g raw ozanimod base obtained in this way is suspended in 36 ml acetonitrile. The mixture is kept at boiling point until a homogenous solution is obtained. The solution is boiled for 5 minutes with 0.2 g active carbon, then filtered. The crystal mass precipitating from the filtrate is heated back up to the boiling point of the solvent, then the solution obtained in this way is left to cool to room temperature. Then maintaining it at a temperature between 0-5° C. the mixture is stirred for a further 1 hour. Following this the mixture is filtered, and the crystals washed with 2×3 ml cold acetonitrile. In this way 1.51 g Form I polymorph crystalline product is obtained, the x-ray powder diffraction lines of which are summarised in the following table:

| Peak | 2θ (°) | d (Å) | Relative intensity (%) |
|---|---|---|---|
| 1 | 2.86 | 30.90 | 28 |
| 2 | 5.77 | 15.32 | 100 |
| 3 | 8.66 | 10.22 | 21 |
| 4 | 10.77 | 8.22 | 13 |
| 5 | 10.87 | 8.14 | 8 |
| 6 | 11.14 | 7.94 | 14 |
| 7 | 11.56 | 7.65 | 28 |
| 8 | 12.20 | 7.25 | 9 |
| 9 | 12.98 | 6.82 | 42 |
| 10 | 13.38 | 6.62 | 97 |
| 11 | 13.90 | 6.37 | 34 |
| 12 | 14.59 | 6.07 | 24 |
| 13 | 15.36 | 5.77 | 14 |
| 14 | 16.23 | 5.46 | 45 |
| 15 | 17.19 | 5.16 | 12 |
| 16 | 17.43 | 5.09 | 4 |
| 17 | 17.73 | 5.00 | 9 |
| 18 | 18.44 | 4.81 | 6 |
| 19 | 18.94 | 4.69 | 13 |
| 20 | 19.54 | 4.54 | 37 |
| 21 | 20.28 | 4.38 | 8 |
| 22 | 20.41 | 4.35 | 2 |
| 23 | 21.10 | 4.21 | 4 |
| 24 | 21.65 | 4.11 | 24 |
| 25 | 21.87 | 4.07 | 6 |
| 26 | 22.10 | 4.02 | 11 |
| 27 | 22.43 | 3.97 | 19 |
| 28 | 22.79 | 3.90 | 6 |
| 29 | 23.36 | 3.81 | 31 |
| 30 | 23.75 | 3.75 | 11 |
| 31 | 23.95 | 3.72 | 16 |
| 32 | 24.62 | 3.62 | 61 |
| 33 | 25.37 | 3.51 | 55 |

| Peak | 2θ (°) | d (Å) | Relative intensity (%) |
|---|---|---|---|
| 34 | 26.16 | 3.41 | 28 |
| 35 | 27.00 | 3.30 | 41 |
| 36 | 27.90 | 3.20 | 26 |
| 37 | 28.86 | 3.09 | 12 |
| 38 | 29.20 | 3.06 | 2 |
| 39 | 29.85 | 2.99 | 1 |
| 40 | 31.00 | 2.89 | 2 |

The characteristic x-ray powder diffractogram of this corresponds to FIG. 3.

Example 7

The dynamic vapour sorption (DVS) measurement of the ozanimod base Form I polymorph according to example 6

Figure 4:
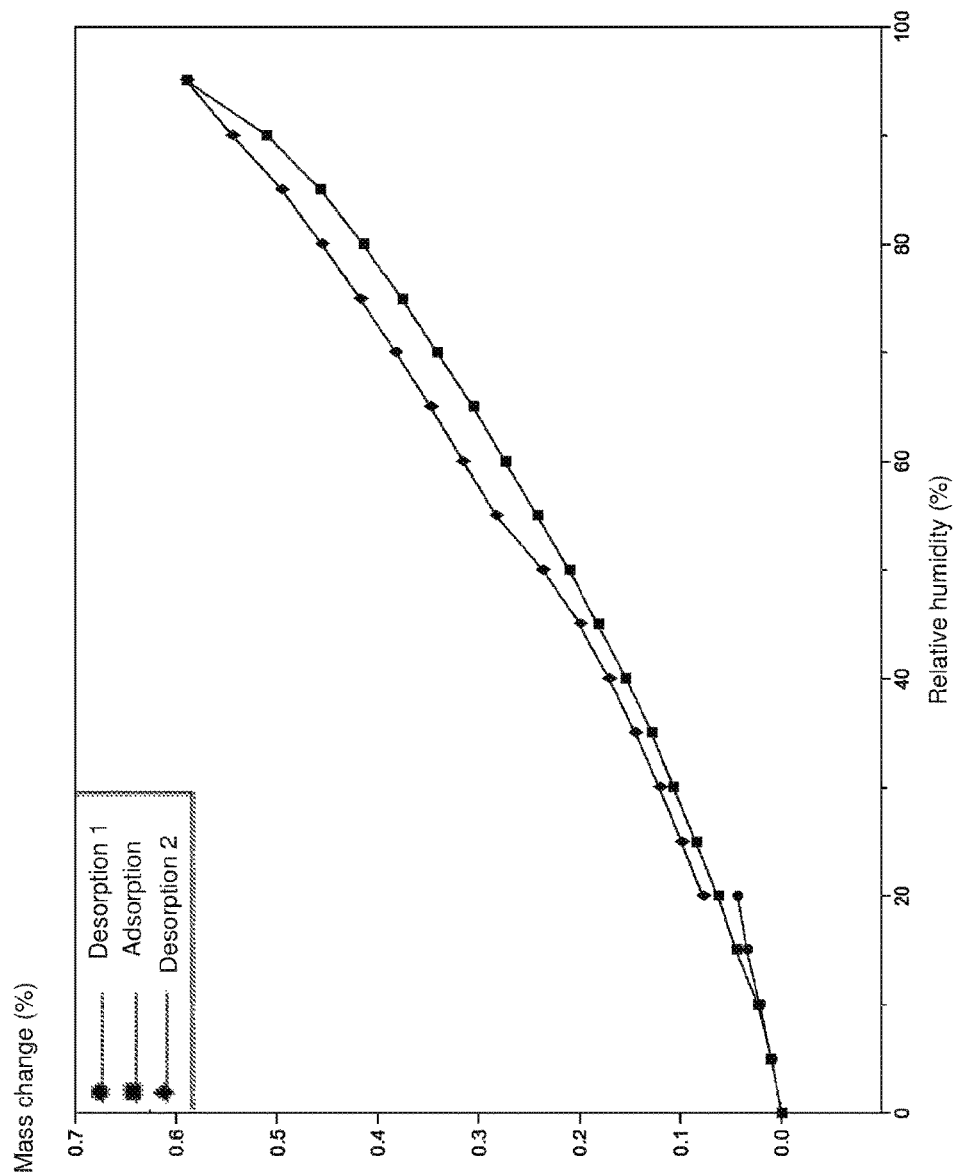

The ozanimod base Form I polymorph is slightly hygroscopic. The mass of the sample increased by 0.6% under 95% relative humidity. The sorption isotherm of the first cycle is shown in FIG. 4. On repeating the cycle the sorption isotherm did not change. What is more is that after the two cycles the unchanged nature of the crystal structure is proved by the x-ray power diffractogram shown in FIG. 5, which is the same as the diffractogram of the initial crystals shown in FIG. 3. From this it can be seen that the ozanimod base Form I polymorph form is stable at 25° C., and not sensitive to humidity.

The invention claimed is:

1. A process for preparing a compound of formula (I) or an acid addition salt of said compound of formula (I)

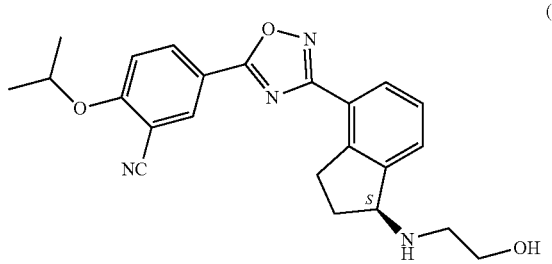

(I)

comprising removing a protective group or protective groups in an organic solvent and an acidic medium from a) a compound of formula (IV)

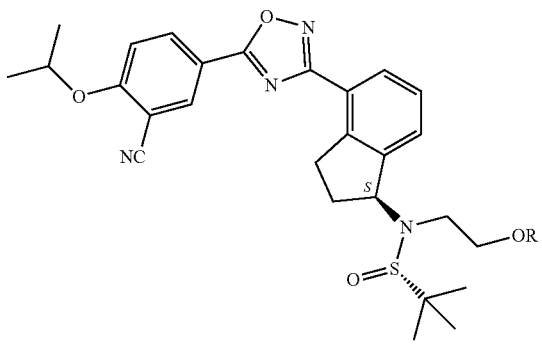

(IV)

in which R represents a protective group selected from the group consisting of substituted methyl ether groups, tetrahydropyranyl groups, substituted ethyl ether groups and silyl ether groups serving as temporary protection of the hydroxyl group on the compound of formula (I), wherein the oxygen residue of the hydroxyl group together with a silyl group forms the silyl ether group, or b) a compound of formula (V)

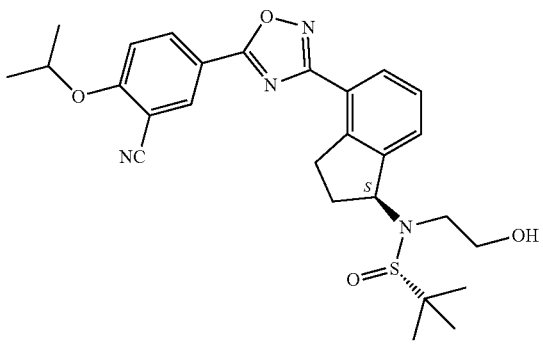

(V)

or c) a mixture of the compound of formula (IV) and the compound of formula (V), and optionally transforming the compound of formula (I) into an acid addition salt.

2. The process according to claim 1, wherein the substituted methyl ether group is a methoxymethyl, benzyloxymethyl, p-methoxybenzyloxymethyl or [(3, 4-dimethoxybenzyl)oxy]methyl group, the substituted ethyl ether group is an ethoxyethyl or 1-[2-(trimethylsilyl)ethoxy]ethyl group, or the silyl group of the silyl ether group is a trimethylsilyl, triisopropylsilyl, t-butyldimethylsilyl or triphenylsilyl group.

3. The process according to claim 1, wherein the protective group or groups are removed from the mixture of the compound of formula (IV) and the compound of formula (V).

4. The process according to claim 1, wherein the organic solvent is an ether solvent, a 1 to 4 carbon atom alcohol or an aromatic solvent.

5. The process according to claim 1, wherein the protective group is removed by an acid.

6. The process according to claim 5, wherein the acid is present in an aqueous solution, in a mixture of organic solvent and water or dissolved in a solvent.

7. The process according to claim 1, which further comprises producing the compound of formula (IV)

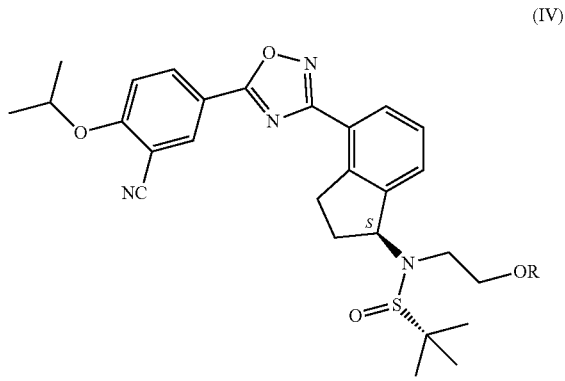

wherein the production comprises
a) activating 3-cyano-4-(i-propyloxy)benzoic acid of formula (VIII)

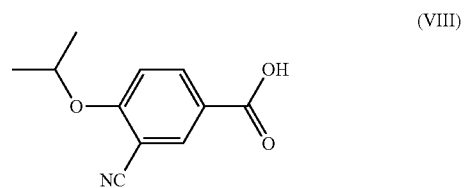

in an organic solvent,
then reacting the activated 3-cyano-4-(i-propyloxy)benzoic acid of formula (VIII) with a compound of formula (III)

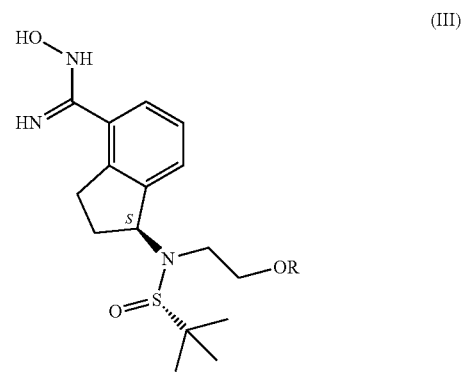

in which R represents a protective group selected from the group consisting of substituted methyl ether groups, tetrahydropyranyl groups, substituted ethyl ether groups, and silyl ether groups, wherein the oxygen residue of the hydroxyl group together with a silyl group forms the silyl ether group,
or reacting the activated 3-cyano-4-(i-propyloxy)benzoic acid of formula (VII) with a compound of formula (III/A)

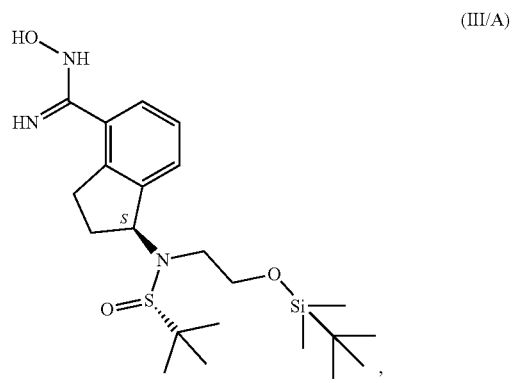

then optionally
b) isolate the obtained compound of formula (IV) and the compound of formula (V) from each other.

8. The process according to claim 7, wherein the 3-cyano-4-(i-propyloxy)benzoic acid of formula (VIII) is activated in an organic solvent selected from the group consisting of amide, aromatic, ether, ester, nitrile and sulfoxide solvents, and then reacted with the compound of formula (III).

9. The process according to claim 7, wherein the organic solvent is dimethylformamide, xylene, toluene, tetrahydrofuran, dioxane, acetonitrile, dimethyl sulfoxide or ethyl acetate.

10. The process according to claim 7, wherein 3-cyano-4-(i-propyloxy)benzoic acid of formula (VIII) is activated with disubstituted carbodiimide, in presence of an organic base, or with carbonyl-diimidazole in presence of hydroxybenzotriazole or ethyl cyano glyoxylate-2-oxime, or with propanephosphonic acid anhydride.

11. The process according to claim 7, wherein the compound of formula (IV) or (V), or the mixture of the compounds of formula (IV) and the compound of formula (V) are transformed into the compound of formula (I) without isolation or purification.

12. The process according to claim 11, comprising reacting the compound of formula (III)

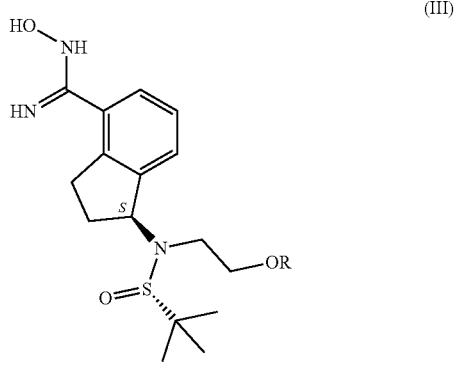

or the compound of formula (III/A)

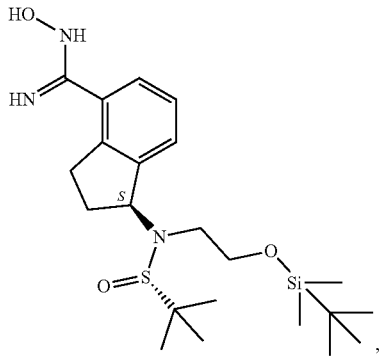

(III/A)

with the compound of formula (VIII) in an aromatic solvent, so that the compound of formula (VIII) is activated with disubstituted carbodiimide, in presence of an organic base, or with carbonyl-diimidazole in presence of hydroxybenzotriazole or ethyl cyano glyoxylate-2-oxime, or with propanephosphonic acid anhydride, then after the reaction has completed the reaction mixture is optionally washed with an aqueous base and/or saturated salt solution, then concentrated hydrochloric acid is added to the aromatic solvent, and precipitated hydrochloride salt of the compound of formula (I) is isolated, and optionally purified.

13. The process according to claim 12, wherein the organic base and disubstituted carbodiimide are combined at a temperature between 20-30° C., then temperature of the reaction mixture is raised to between 60° C. and boiling point of the aromatic solvent, and maintained at the raised temperature until the reaction is complete, then the reaction mixture is cooled and then optionally washed with an aqueous alkali solution, and optionally washed with a saturated sodium chloride solution, and then organic phase is reacted with concentrated aqueous hydrochloric acid solution (37%) at a temperature of between 60° C. and boiling point of the aromatic solvent forming a mixture, then the mixture is cooled, precipitated crystals are filtered out, dried and optionally transformed into a base.

14. The process according to claim 1, wherein the compound of formula (I) is precipitated in a form of crystalline hydrochloride salt, and the crystalline hydrochloride salt of the compound of formula (I) is further transformed into a base.

15. The process according to claim 7, wherein the compound of formula (III)

has been produced by reacting a compound of formula (II)

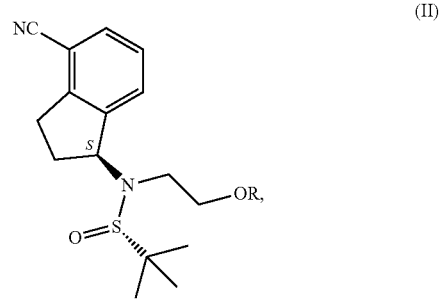

(II)

in which R is as defined for formula (III), or a compound of formula (II/A)

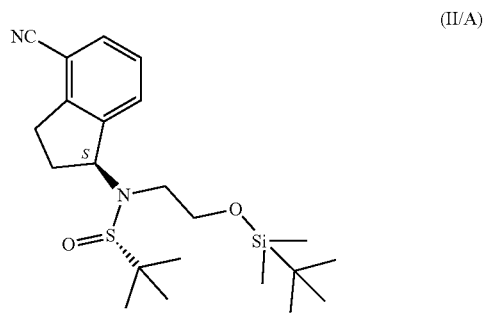

(II/A)

with hydroxylamine hydrochloride in an organic solvent in presence of a base.

16. The process according to claim 1, comprising reacting a) the compound of formula (IV)

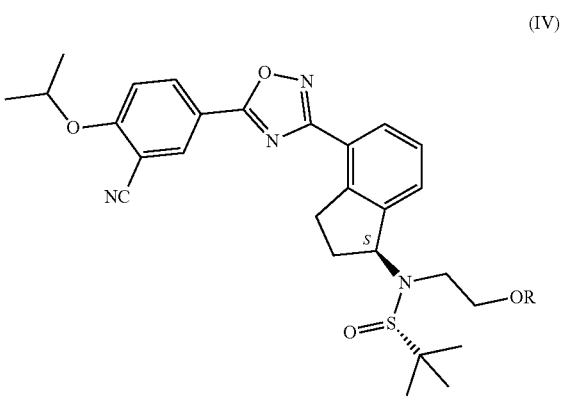

(IV)

in which R represents a t-butyldimethylsilyl group, or b) the compound of formula (V)

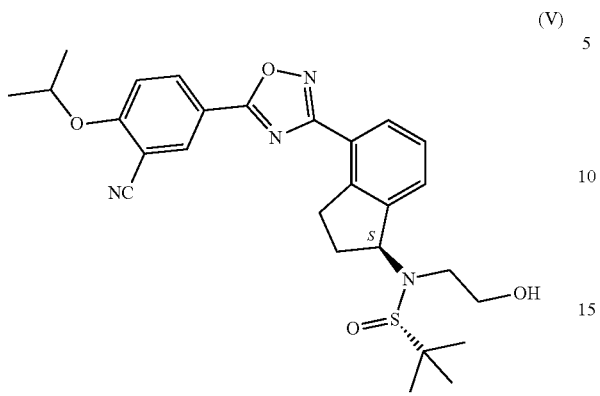

or
c) the mixture of the compound of formula (IV) in which R represents a t-butyldimethylsilyl group, and the compound of formula (V),
with an inorganic acid in a 1 to 4 carbon atom alcohol and the compound of formula (I) obtained is optionally transformed into an acid addition salt;
or
comprising producing the compound of formula (IV),
or
the compound of formula (V) or the mixture of the compounds of formula (IV) and the compounds of formula (V), wherein the production comprises
a) reacting a compound of formula (VI)

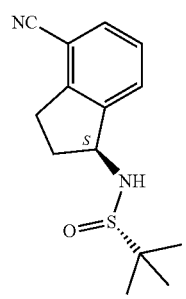

in organic dimethylformamide in presence of sodium hydride as a base with a compound of formula (VII)

in which R represents a substituted methyl ether group, a tetrahydropyranyl group, or a substituted ethyl ether group, or a silyl ether group, wherein the oxygen residue of the hydroxyl group together with a silyl group forms the silyl ether group, and X represents Cl, Br or I, then b) reacting an obtained compound of formula (II)

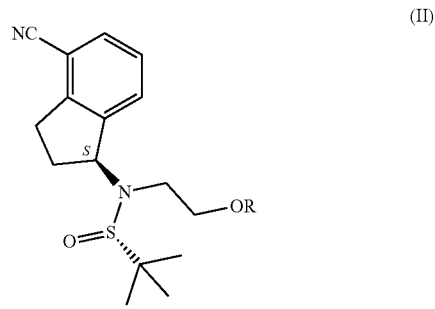

in which R represents a substituted methyl ether group, a tetrahydropyranyl group, or a substituted ethyl ether group, or a silyl ether group, wherein the oxygen residue of the hydroxyl group together with a silyl group forms the silyl ether group,
with hydroxylamine hydrochloride in a 1 to 4 carbon atom alcohol in presence of triethylamine as organic base, then
c) reacting an obtained compound of formula (III)

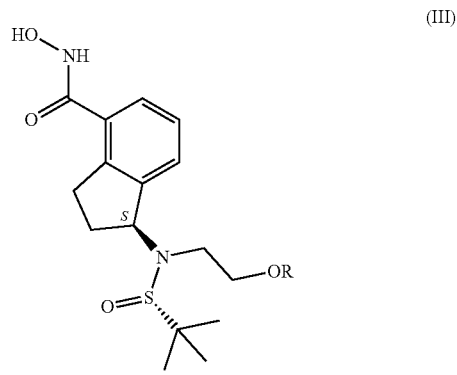

with a compound of formula (VIII) 3-cyano-4-(i-propyloxy) benzoic acid activated with propanephosphonic acid anhydride in ethyl acetate.

17. The process according to claim 1, wherein the organic solvent is dioxane, 2-propanol, ethanol, methanol, toluene or xylene.

18. The process according to claim 1, wherein the protective group is removed by an acid selected from the group consisting of aqueous hydrochloric acid, hydrochloric acid, hydrogen bromide, hydrogen iodide, hydrogen fluoride, sulphuric acid, nitric acid, salts of the acids thereof, tetrabutylammonium fluoride, mixtures of tetrabutylammonium fluoride and acetic acid, aqueous mixtures of hydrogen fluoride and tetrahydrofuran, or 1 M aqueous $HIO_4$ in tetrahydrofuran.

19. The process according to claim 5, wherein the acid is present in an aqueous solution, in a mixture of water and dioxane, 2-propanol, ethanol or methanol or dissolved in dioxane, 2-propanol, ethanol or methanol.

20. The process according to claim 7, wherein
the substituted methyl ether group is a methoxymethyl, benzyloxymethyl, p-methoxybenzyloxymethyl or [(3, 4-dimethoxybenzyl)oxy]methyl group, the substituted ethyl ether group is an ethoxyethyl or 1-[2-(trimethylsilyl)ethoxy]ethyl group, and the silyl group of the silyl ether group is a trimethylsilyl, triisopropylsilyl, t-butyldimethylsilyl or triphenylsilyl group.

21. The process according to claim 7, wherein the benzoic acid compound of formula (VIII) is activated with dicyclohexylcarbodiimide or 1-ethyl-3-(3-dimethylaminopropyl)carbodiimide in presence of diisopropylethylamine or triethylamine.

22. A process for preparing a compound of formula (I) or an acid addition salt of said compound of formula (I)

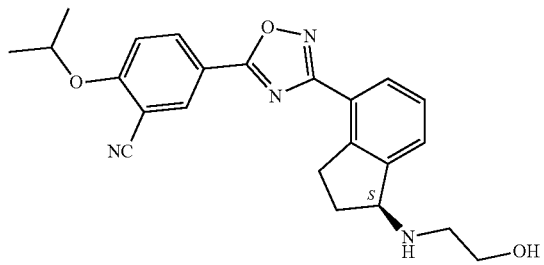
(I)

comprising removing a protective group or protective groups in an organic solvent and an acidic medium from a) a compound of formula (IV)

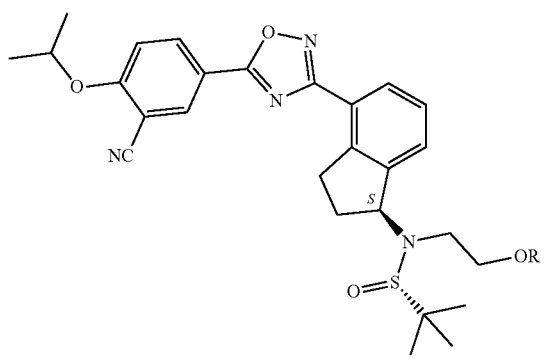
(IV)

in which R represents a protective group selected from the group consisting of substituted methyl ether groups, tetrahydropyranyl groups, substituted ethyl ether groups and silyl ether groups serving as temporary protection of the hydroxyl group on the compound of formula (I), wherein the oxygen residue of the hydroxyl group together with a silyl group forms the silyl ether group, or b) a compound of formula (V)

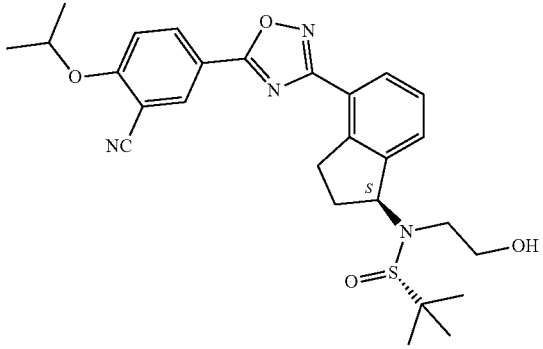
(V)

or c) a mixture of the compound of formula (IV) and the compound of formula (V), and
optionally transforming the compound of formula (I) into an acid addition salt, and
wherein the compound of formula (IV) or the compound of formula (V) have been prepared from of a compound of formula (III), (II) or (III/A),
and
wherein a compound of formula (III)

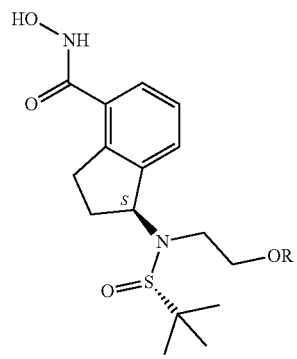
(III)

in which R represents a protective group selected from the group consisting of substituted methyl ether groups, tetrahydropyranyl groups, substituted ethyl ether groups, and silyl ether groups, wherein the oxygen residue of the hydroxyl group together with a silyl group forms the silyl ether group, has been produced from a compound of formula (VI)

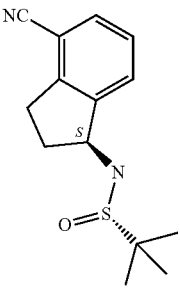
(VI)

and a compound of formula (II) is not isolated

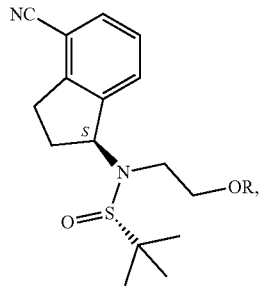

(II)

in which R represents a protective group selected from the group consisting of substituted methyl ether groups, tetrahydropyranyl groups, substituted ethyl ether groups, and silyl ether groups, wherein the oxygen residue of the hydroxyl group together with a silyl group forms the silyl ether group;

or wherein the compound of formula (II) is produced in a reaction mixture, wherein a reaction mixture containing dimethylformamide and surplus alkylating agent is extracted with a mixture of water and an ester solvent, and an oil obtained by evaporating an ethyl acetate phase is, without further purification, dissolved in an alcohol solvent, and then reacted with hydroxylamine in presence of a base;

or wherein a compound of formula (III/A)

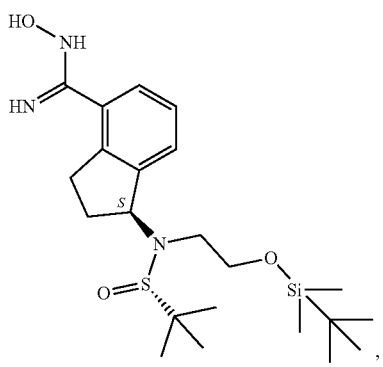

(III/A)

is produced from the compound of formula (VI), an alkylating agent that is (2-bromoethoxy)-t-butyldimethylsilane, and a base that is sodium hydride, to give an obtained compound of formula (II/A)

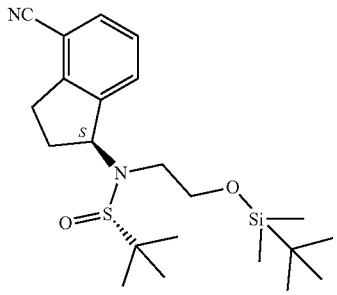

(II/A)

which is then dissolved in an alcohol solvent, and reacted with hydroxylamine hydrochloride in presence of a base to give the compound of formula (III/A).

23. The process according to claim 22, further comprising reacting a compound of formula (II) or formula (II/A) with hydroxylamine hydrochloride in a 1 to 4 carbon atom alcohol in presence of triethylamine or diisopropyl-ethylamine.

24. The process according to claim 22, wherein the compound of formula (II) is produced by reacting the compound of formula (VI)

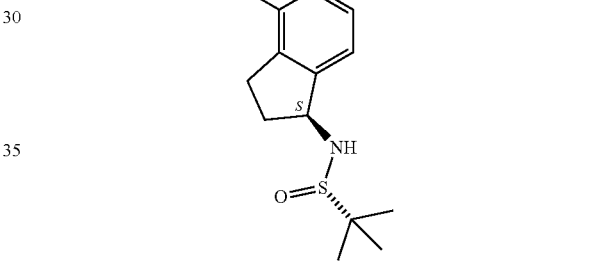

(VI)

with a base in an organic solvent, then reacted with a compound of formula

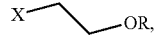

(VII)

in which R represents a protective group selected from the group consisting of substituted methyl ether groups, tetrahydropyranyl groups, substituted ethyl ether groups, and silyl ether groups, wherein the oxygen residue of the hydroxyl group together with a silyl group forms the silyl ether group, and X represents Cl, Br or I.

25. The process according to claim 22, wherein
the organic solvent is selected from the group consisting of amide solvents, dimethylformamide, ether solvents, tetrahydrofuran and acetonitrile or a mixture thereof;
or
the reaction with hydroxylamine or hydroxylamine hydrochloride in presence of a base is where the base is sodium hydride, potassium tert-butoxide, caesium carbonate or hexamethyldisilazane.

* * * * *